(12) United States Patent
Oono et al.

(10) Patent No.: US 10,174,700 B2
(45) Date of Patent: Jan. 8, 2019

(54) ONBOARD CONTROL DEVICE

(71) Applicant: Hitachi Automotive Systems, Ltd., Hitachinaka-shi, Ibaraki (JP)

(72) Inventors: Shigemi Oono, Hitachinaka (JP); Shinsaku Tsukada, Hitachinaka (JP); Yoshihiko Akagi, Hitachinaka (JP); Sadato Horiuchi, Htachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 164 days.

(21) Appl. No.: 15/114,112

(22) PCT Filed: Dec. 8, 2014

(86) PCT No.: PCT/JP2014/082355
§ 371 (c)(1),
(2) Date: Jul. 26, 2016

(87) PCT Pub. No.: WO2015/118766
PCT Pub. Date: Aug. 13, 2015

(65) Prior Publication Data
US 2017/0002763 A1    Jan. 5, 2017

(30) Foreign Application Priority Data

Feb. 4, 2014 (JP) ................................ 2014-019604

(51) Int. Cl.
*F02D 29/02* (2006.01)
*B60R 16/02* (2006.01)
(Continued)

(52) U.S. Cl.
CPC .......... *F02D 41/222* (2013.01); *F02D 11/105* (2013.01); *F02D 11/107* (2013.01);
(Continued)

(58) Field of Classification Search
CPC ......... F02D 2200/1004; F02D 2250/18; F02D 2200/1002
See application file for complete search history.

(56) References Cited

U.S. PATENT DOCUMENTS 4,940,030 A * 7/1990 Morikawa ............. F02D 11/107
123/198 D
5,018,383 A 5/1991 Togai et al.
(Continued)

FOREIGN PATENT DOCUMENTS

DE  199 22 173 A1  11/1999
JP  2-267342 A  11/1990
(Continued)

OTHER PUBLICATIONS

International Search Report (PCT/ISA/210) issued in PCT Application No. PCT/JP2014/082355 dated Mar. 17, 2015 with English translation (3 pages).
(Continued)

*Primary Examiner* — Hieu T Vo
*Assistant Examiner* — Arnold Castro
(74) *Attorney, Agent, or Firm* — Crowell & Moring LLP

(57) ABSTRACT

To quickly determine whether or not the propulsive force of a vehicle drive source is abnormal. The onboard control device pertaining to the present invention has a drive manipulated variable detection unit for detecting or estimating a drive manipulated variable manipulated by a driver in order to impart a propulsive force to a vehicle, a command value calculation unit for calculating a command value for a drive source of the vehicle on the basis of the drive manipulated variable, a propulsive force control unit for controlling the propulsive force of the drive source on the basis of the command value, operating state detection units for detecting or estimating the operating states of the drive source, a drive manipulation rate of change calculation unit
(Continued)

for calculating the rate of change in drive manipulation, an operating state rate of change calculation unit for calculating the rate of change in the operating state, and an abnormality detection unit for detecting abnormalities in at least the drive source on the basis of the rate of change in drive manipulation and the rate of change in the operating state.

9 Claims, 19 Drawing Sheets

(51) Int. Cl.
*F02D 17/04* (2006.01)
*F02D 43/00* (2006.01)
*F02D 45/00* (2006.01)
*F02D 41/22* (2006.01)
*F02D 41/26* (2006.01)
*F02D 41/14* (2006.01)
*F02D 11/10* (2006.01)

(52) U.S. Cl.
CPC ......... *F02D 41/1497* (2013.01); *F02D 41/22* (2013.01); *F02D 41/26* (2013.01); *F02D 2200/0406* (2013.01); *F02D 2200/0612* (2013.01); *F02D 2200/101* (2013.01); *F02D 2200/1002* (2013.01); *F02D 2200/1004* (2013.01); *F02D 2200/501* (2013.01); *F02D 2200/602* (2013.01); *F02D 2250/18* (2013.01); *Y02T 10/40* (2013.01)

(56) References Cited

U.S. PATENT DOCUMENTS

| | | | |
|---|---|---|---|
| 6,073,715 A * | 6/2000 | Wolf | B60K 28/10 123/198 D |
| 2003/0183194 A1* | 10/2003 | Noguchi | F02D 11/105 123/396 |
| 2004/0055567 A1* | 3/2004 | Doelker | F02D 41/22 123/350 |
| 2006/0142924 A1 | 6/2006 | Nakagawa et al. | |
| 2007/0034440 A1* | 2/2007 | Zomotor | B60K 28/02 180/275 |
| 2010/0036558 A1 | 2/2010 | Murakami | |
| 2010/0057331 A1 | 3/2010 | Yamashita | |

FOREIGN PATENT DOCUMENTS

| | | |
|---|---|---|
| JP | 11-44246 A | 2/1999 |
| JP | 11-321687 A | 11/1999 |
| JP | 2002-256959 A | 9/2002 |
| JP | 2006-183506 A | 7/2006 |
| JP | 2010-43536 A | 2/2010 |
| JP | 2010-53823 A | 3/2010 |

OTHER PUBLICATIONS

Japanese-language Written Opinion (PCT/ISA/237) issued in PCT Application No. PCT/JP2014/082355 dated Mar. 17, 2015 (3 pages).
Japanese-language Office Action issued in counterpart Japanese Application No. 2018-021060 dated Oct. 9, 2018 with English translation (seven (7) pages.).

* cited by examiner

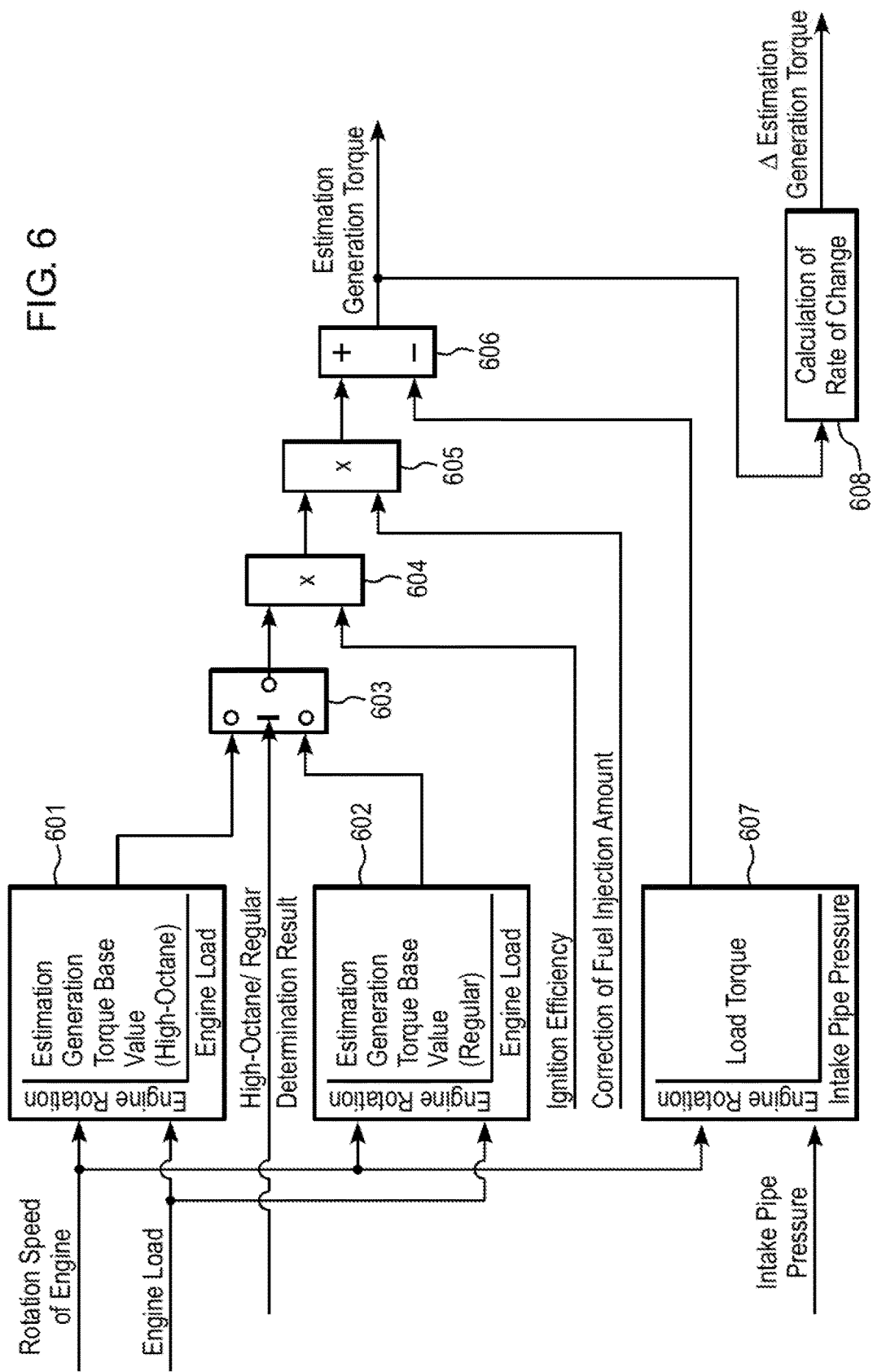

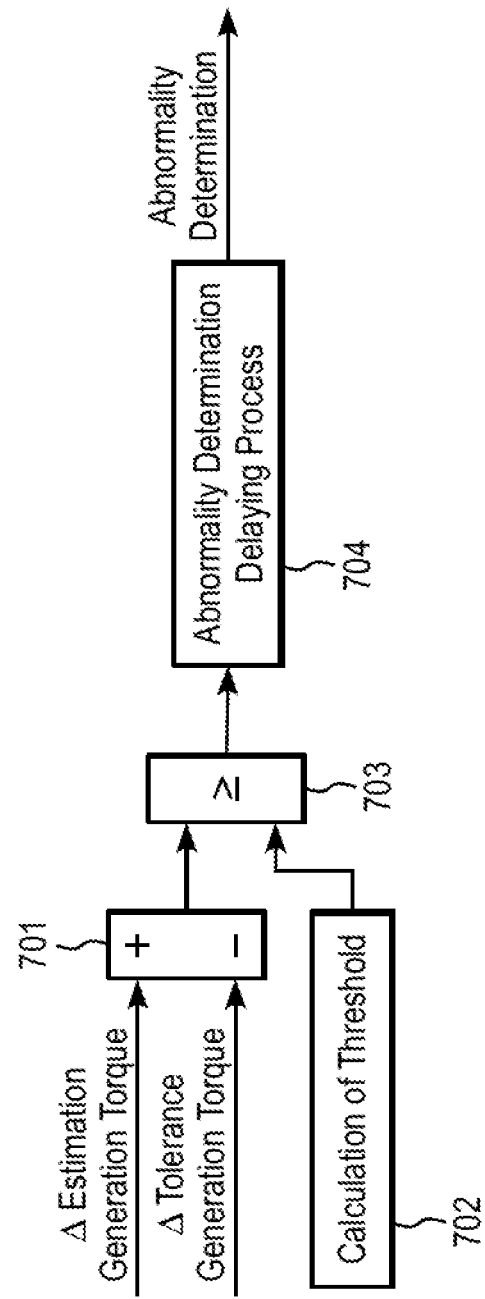

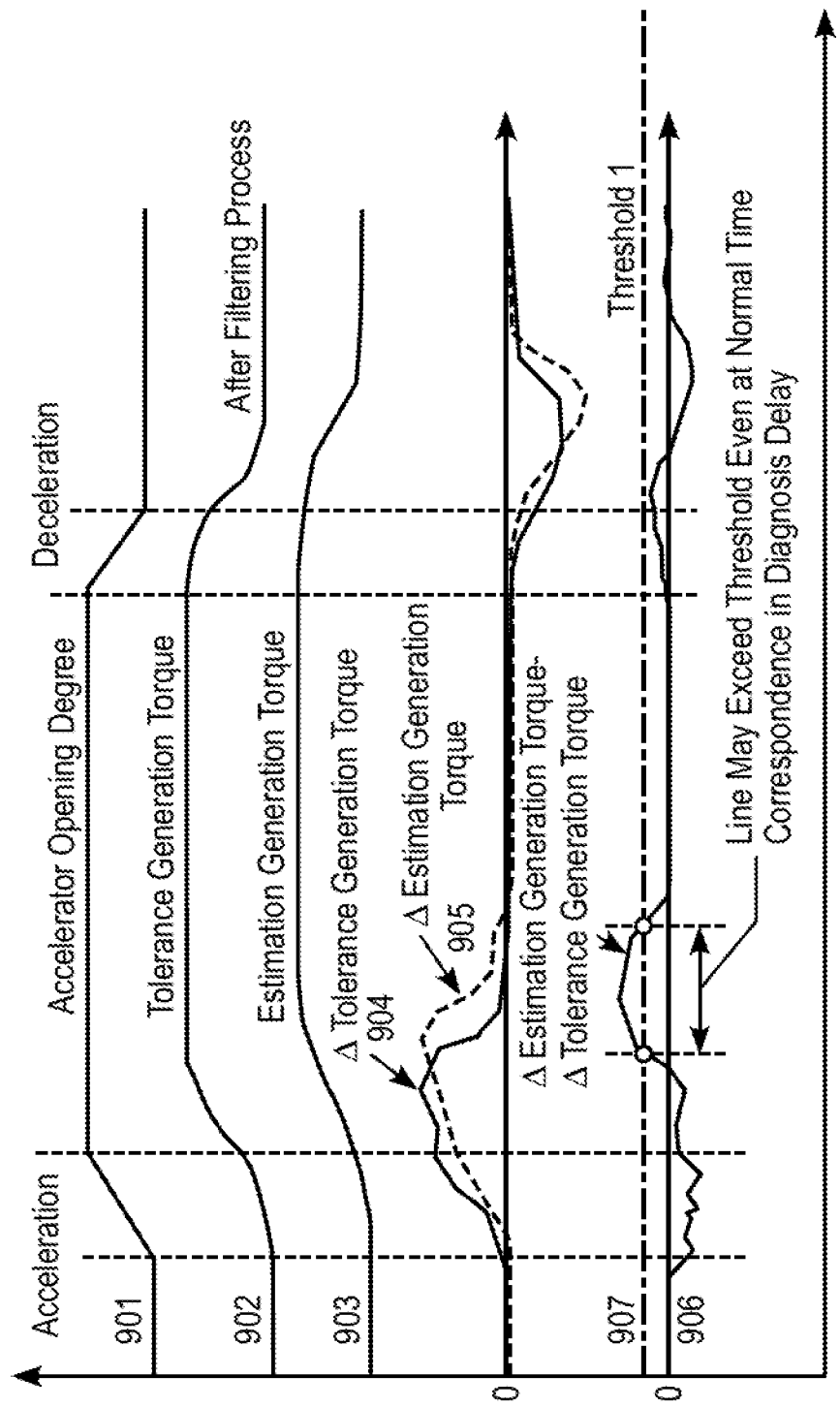

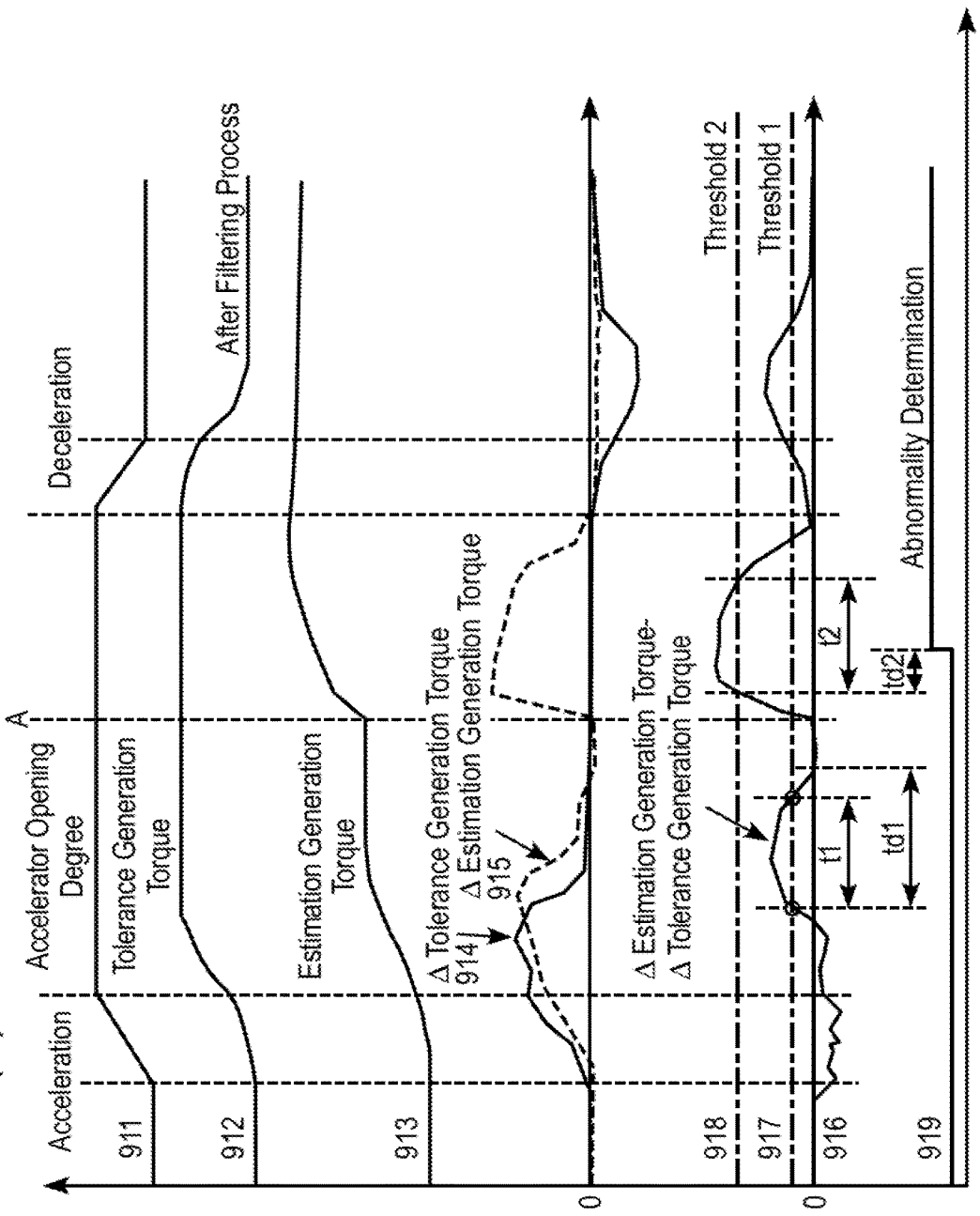

ONBOARD CONTROL DEVICE

TECHNICAL FIELD

The present invention relates to control of a propulsive force of a drive source of a vehicle and, in particular, relates to an onboard control device having a function of monitoring whether or not a propulsive force equal to or greater than a propulsive force which is intended by a driver is generated from the drive source.

BACKGROUND ART

In the related art, a technique is known which determines, as abnormality, a case in which an estimated torque becomes excessive with respect to a required torque by comparing the required torque of a driver calculated on the basis of a drive manipulated variable (for example, an accelerator opening degree detection value and the like) by the driver with the estimated torque calculated on the basis of operating states (for example, a detection value of an intake air volume to an internal combustion engine and the like) of a drive source (see PTL 1).

CITATION LIST

Patent Literature

PTL 1: US Patent Application Publication No. 2010/0036558A

SUMMARY OF INVENTION

Technical Problem

There is a change in performance due to a variation of performance and deterioration over time in various sensors such as a sensor for detecting an accelerator opening degree as a drive manipulated variable and a sensor for detecting an intake air volume to an internal combustion engine as the operating state of a drive source. In addition, there is also a variation in the drive source and, for example, in a case of an internal combustion engine, there is a friction variation due to a weight of each configuration component, assembly errors, and the like.

Therefore, in PTL 1, it is necessary to set a margin in a threshold for determining that the estimated torque calculated on the basis of the detection value of the intake air volume is excessive and abnormal with respect to the required torque of the driver calculated on the basis of the accelerator opening degree detection value and the like, in consideration of each variation described above. However, if the margin is set to be large, the determination of the abnormality cannot be performed or it may take time for the determination of the abnormality and thereby risk avoidance (also including that it does not feel danger) may not be provided to the driver. That is, as described in PTL 1, in the technique that performs a magnitude comparison between the required torque on the driver side calculated from the detection value of each sensor and the estimated torque on the drive source side, there is a problem that it is difficult to quickly determine whether or not the propulsive force of the drive source of the vehicle is abnormal.

The present invention is made to solve the problem and an object of the invention is to provide an onboard control device which is able to quickly determine whether or not a propulsive force of a drive source of a vehicle is abnormal.

Solution to Problem

In order to achieve the object, an onboard control device of the invention includes: a drive manipulated variable detection unit that detects or estimates a drive manipulated variable manipulated by a driver in order to impart a propulsive force to a vehicle; a command value calculation unit that calculates a command value for a drive source of the vehicle on the basis of the drive manipulated variable; a propulsive force control unit that controls the propulsive force of the drive source on the basis of the command value; operating state detection units that detect or estimate operating states of the drive source; a drive manipulation rate of change calculation unit that calculates the rate of change in drive manipulation that is a rate of change in the drive manipulated variable or in a calculation value calculated on the basis of the drive manipulated variable; an operating state rate of change calculation unit that calculates the rate of change in the operating state that is a rate of change in the operating state or in a calculation value calculated on the basis of the operating state; and an abnormality detection unit that detects abnormalities in at least the drive source on the basis of the rate of change in drive manipulation and the rate of change in the operating state.

Advantageous Effects of Invention

According to the invention, the abnormalities of the drive source are determined from the rate of change in drive manipulation and the rate of change in the operating state, and thereby it is possible to quickly determine whether or not the propulsive force of the drive source of the vehicle is abnormal. Moreover, problems, configurations, and effects other than the above description will become apparent from the following description of embodiments.

BRIEF DESCRIPTION OF DRAWINGS

FIG. 6 is a diagram illustrating details of a calculation procedure of a rate of change in an estimation generation torque by estimation generation torque calculation means illustrated in FIG. 1.

FIG. 7 is a diagram illustrating details of an abnormality determination procedure of the engine by abnormality detection means 112 illustrated in FIG. 1.

FIG. 9A is a chart illustrating a behavior of abnormality detection at a normal time and FIG. 9B is a chart illustrating a behavior of abnormality detection at an abnormal time.

DESCRIPTION OF EMBODIMENTS

Figure 1A:
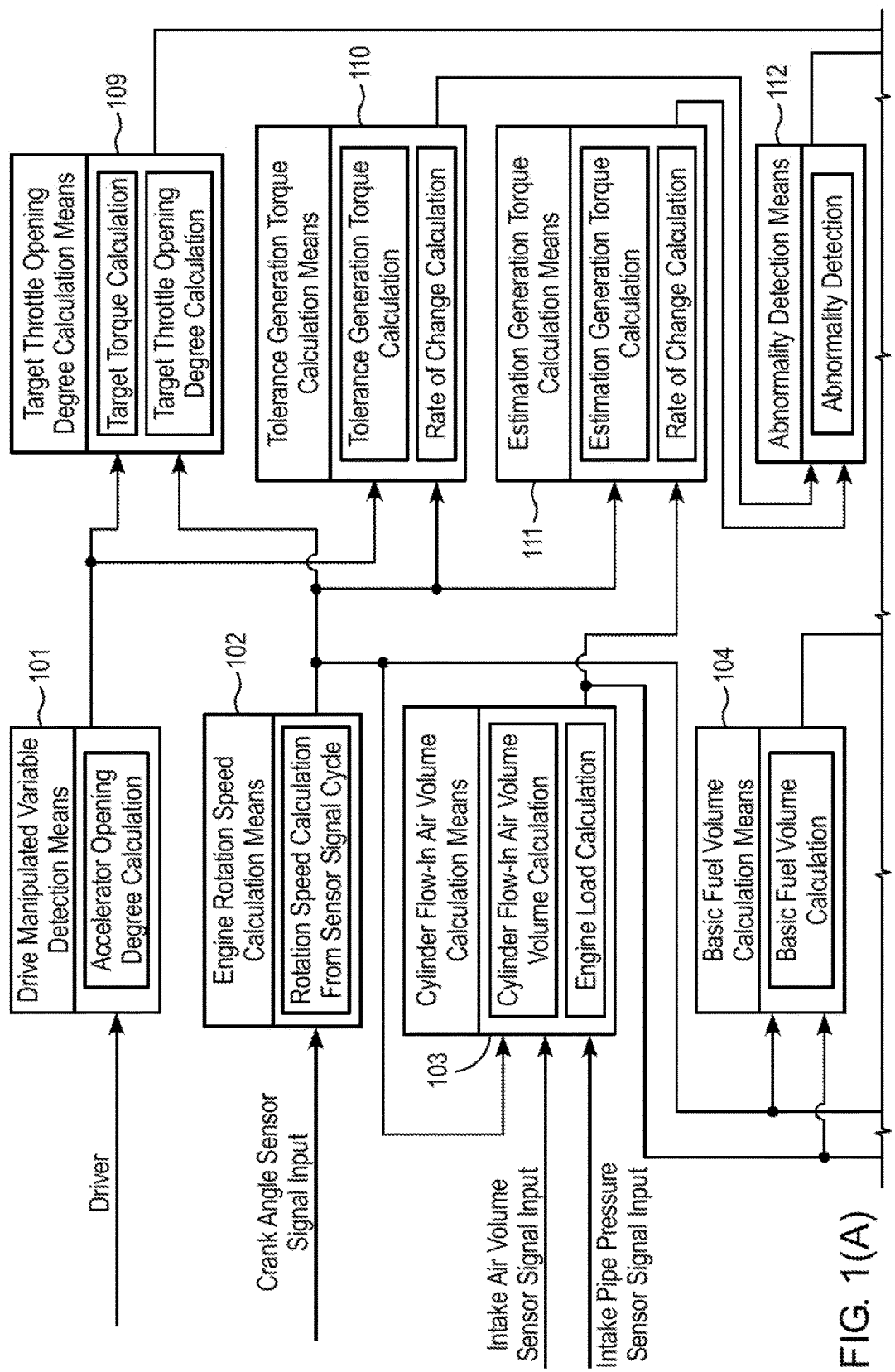
FIGS. 1(A) and 1(B) are control block diagrams of an onboard control device according to an embodiment of the invention.
Figure 1B:
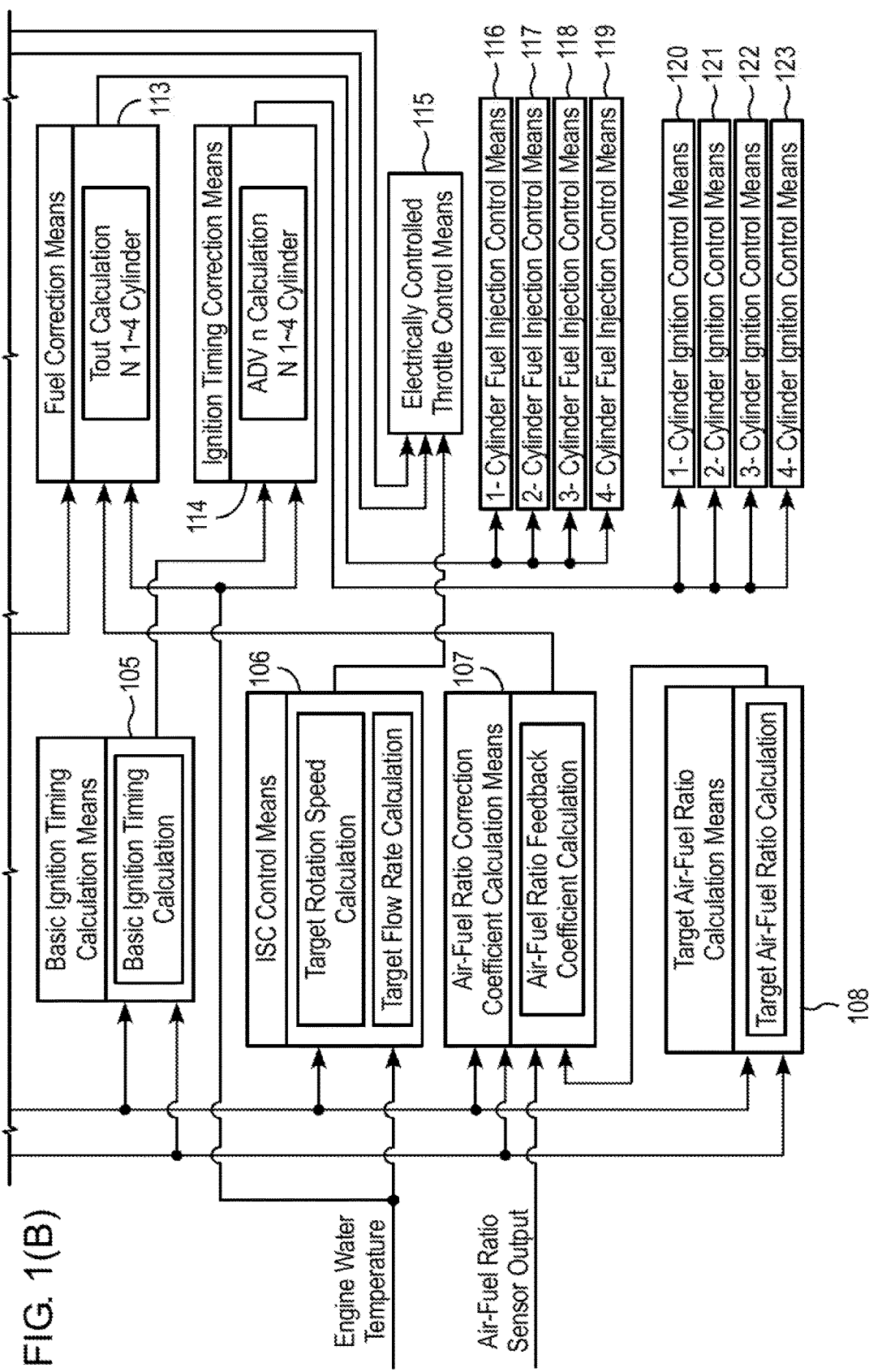

Hereinafter, an embodiment of the invention will be described with reference to the drawings. FIGS. 1(A) and 1(B) (hereinafter "FIG. 1") are a control block diagram of an onboard control device according to the embodiment of the invention.

A block 101 is a block of drive manipulated variable detection means (movement manipulated variable detection unit). In the embodiment, the movement manipulated variable detection means 101 calculates an accelerator opening degree (drive manipulated variable) of a driver. A block 102 is a block of engine rotation speed calculation means. The engine rotation speed calculation means (operating state detection unit) 102 counts the number of inputs for unit time of electrical signals, mainly pulse signal changes of a crank angle sensor which is set in a predetermined crank angle position of the engine and calculates a rotation speed (operating state) for unit time of the engine by calculation processing.

A block 103 is a block of cylinder flow-in air volume calculation means. The cylinder flow-in air volume calculation means (operating state detection unit) 103 calculates a cylinder flow-in air volume (operating state) from inputs of an intake air volume sensor signal that is set on an upstream side of an intake system of the engine and an intake pipe pressure sensor signal that is set in an intake pipe. In addition, the cylinder flow-in air volume calculation means 103 calculates a load (operating state) of the engine from the cylinder flow-in air volume and the rotation speed of the engine described above.

A block 104 is a block of basic fuel volume calculation means. The basic fuel volume calculation means 104 calculates a basic fuel volume required by the engine in each region from the rotation speed of the engine calculated in the block 102 and the engine load calculated in the block 103 described above.

A block 105 is a block of basic ignition timing calculation means that determines an appropriate basic ignition timing in each region of the engine from the rotation speed of the engine described above and the engine load described above. A block 106 is a block of ISC control means that calculates a target rotation speed and calculates a target flow rate at the time of idling for maintaining an idling speed of the engine. A block 107 is a block of air-fuel ratio correction coefficient calculation means that calculates an air-fuel ratio feedback correction coefficient from an output of an air-fuel ratio sensor that is set in an exhaust pipe of the engine, a difference in a target air-fuel ratio described below, the rotation speed of the engine, and the engine load.

A block 108 is a block of target air-fuel ratio calculation means that determines the target air-fuel ratio of the engine as a target from the rotation speed of the engine and the engine load described above. A block 109 is a block of target throttle opening degree calculation means that calculates a target torque (command value) required by the driver from the accelerator opening degree of the driver and the rotation speed of the engine described above, and calculates a target throttle opening degree (command value) from the target torque.

A block 110 is a block of tolerance generation torque calculation means (drive manipulation rate of change calculation unit) that calculates the tolerance generation torque from the accelerator opening degree of the driver and the rotation speed of the engine described above. In addition, the tolerance generation torque calculation means 110 also calculates a rate of change in the tolerance generation torque for the abnormality detection described below. Moreover, the tolerance generation torque is a torque which is able to be generated by the engine at a normal time.

A block 111 is a block of estimation generation torque calculation means (operating state rate of change calculation unit) that calculates the estimation generation torque from the rotation speed of the engine and the engine load described above. Similarly, the estimation generation torque calculation means 111 also calculates the rate of change in the estimation generation torque for the abnormality detection described below. Moreover, the estimation generation torque is obtained by estimating a torque generated by the engine.

A block 112 is a block of abnormality detection means (abnormality detection unit) that performs the abnormality detection from the rate of change in the tolerance generation torque and the rate of change in the estimation generation torque described above. In the embodiment, the abnormality detection means 112 determines the abnormality in a case in which a state where the rate of change in the estimation generation torque is greater than the rate of change in the tolerance generation torque is continued.

A block 113 is a block of fuel correction means that performs a correction of a basic fuel volume calculated in the block 104 described above by an engine water temperature and a correction of the air-fuel ratio feedback coefficient of the block 107 described above. Blocks 116 to 119 are fuel injection control means that control fuel supply on the engine on the basis of a fuel volume calculated in the block 104 and the block 113 described above.

A block 114 is a block of ignition timing correction means that performs the correction by the engine water temperature and the like at the basic ignition timing determined in the block 105 described above. Blocks 120 to 123 are ignition control means that control a fuel mixture flowing into a cylinder in accordance with a required ignition timing of the engine corrected in the block 114 described above to be ignited.

A block 115 is a block of electrically controlled throttle control means (propulsive force control unit). The electrically controlled throttle control means 115 controls an electrically controlled throttle so as to be in a throttle opening degree for securing a target flow rate at the time of idling described above and in the target throttle opening degree described above, and performs control at an abnormal time in a case in which the abnormality is detected in the block 112 described above.

In addition, in the embodiment, the abnormality detection is performed in a dimension of torque so as to detect the abnormality from the estimation generation torque which are calculated from the tolerance generation torque, the rotation speed of the engine, and the engine load calculated from the accelerator opening degree of the driver, but in another dimension, for example, the abnormality detection may be performed by a horsepower. That is, the abnormality may be detected using the horsepower by converting from the torque to the horsepower.

Figure 2:
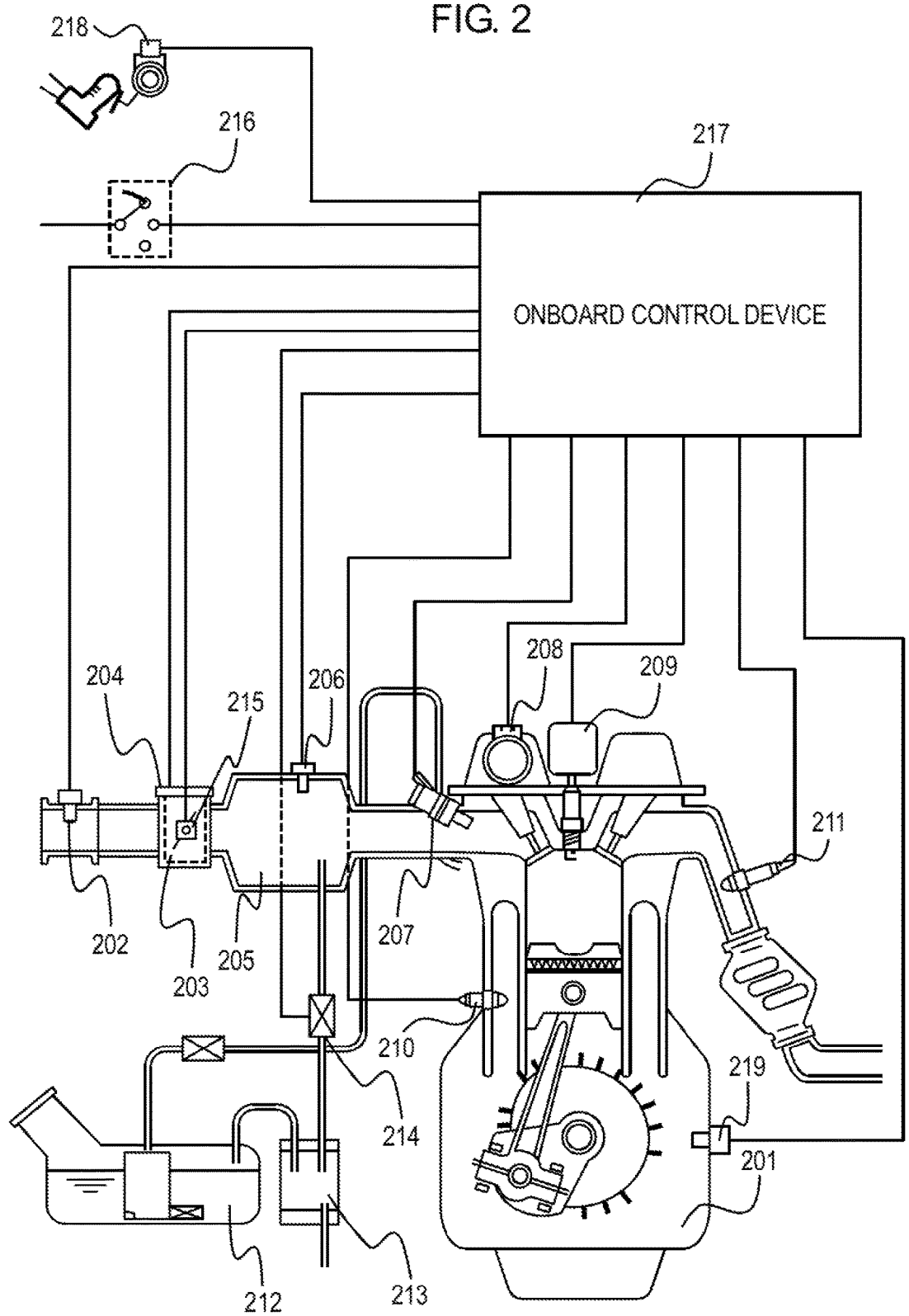
FIG. 2 is a configuration view of an engine and peripheral devices which are controlled by the onboard control device according to the embodiment of the invention.

FIG. 2 illustrates a configuration example of the engine and peripheral devices which are controlled by the onboard control device according to the embodiment. An engine 201 has an intake air volume sensor (thermal air flow meter) 202 that measures an intake air volume, a throttle valve 203 that adjusts an intake air flow rate of the engine 201, an accelerator opening degree sensor 218 that detects the accelerator opening degree of the driver, an electrically controlled throttle motor 204 that operates the throttle valve 203, a throttle opening degree sensor 215 that detects an opening of the throttle valve 203, an intake pipe pressure sensor 206 that detects a pressure within an intake pipe disposed in an intake pipe 205, a fuel injection valve 207 that supplies fuel required for the engine 201, a crank angle sensor 219 that recognizes a protrusion set in a predetermined crank angle position for calculating the rotation speed of the engine 201, a cam angle sensor 208 that recognizes a protrusion set in a predetermined cam angle position apart from the crank angle sensor described above in order to recognize strokes of the engine 201, an ignition module 209 that supplies ignition energy on a spark plug to ignite the fuel mixture supplied within the cylinder of the engine 201 on the basis of an ignition signal of an onboard control device 217, a water temperature sensor 210 that is set in a cylinder block of the engine 201 and detects a cooling water temperature of the engine 201, and an air-fuel ratio sensor 211 that is disposed in front of a catalyst of the exhaust pipe of the engine 201 and outputs a linear electrical signal with respect to oxygen concentration in exhaust gas.

In addition, a canister purge tank 213 that absorbs and holds fuel gas evaporating from a fuel tank 212 using charcoal and the like, a canister purge valve 214 that causes the fuel gas, which is absorbed and held in the canister purge tank 213, to flow into the intake pipe by adjusting opening degree thereof, and an ignition key switch 216 that is a main switch for driving and stopping the engine 201 are provided in a periphery of the engine 201. Then, the engine 201 and the peripheral devices are controlled by the onboard control device 217 according to the embodiment of the invention.

Figure 3:
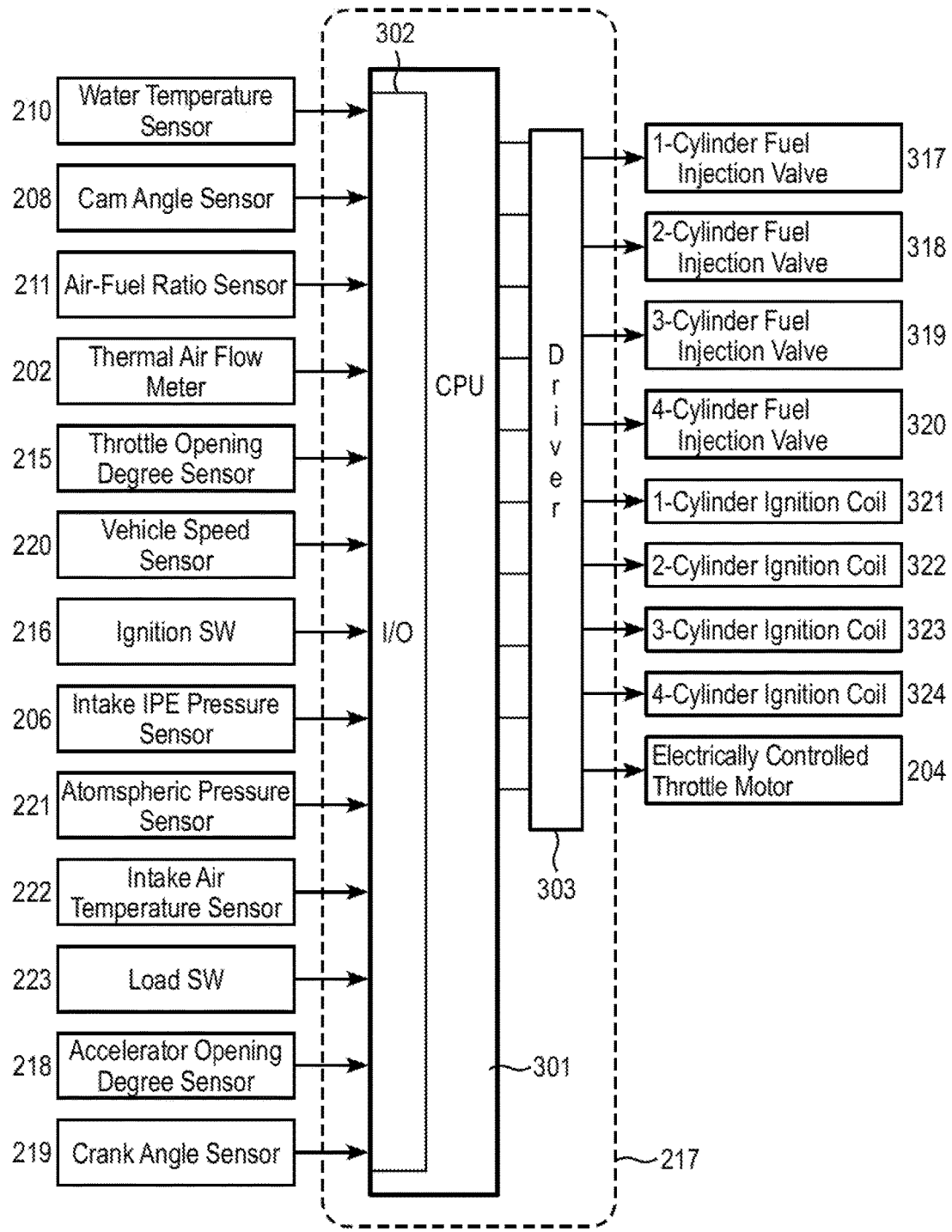
FIG. 3 is an internal configuration diagram of the onboard control device according to the embodiment of the invention.

FIG. 3 is an internal configuration diagram of the onboard control device according to the embodiment of the invention. An I/O unit 302, which converts the electrical signal of each sensor disposed in the engine 201 into a signal for digital calculation processing and converts the control signal for digital calculation into a drive signal of an actual actuator, is set in a CPU 301. The water temperature sensor 210, the cam angle sensor 208, the air-fuel ratio sensor 211, the intake air volume sensor (thermal air flow meter) 202, the throttle opening degree sensor 215, a vehicle speed sensor 220, the ignition SW 216, the intake pipe pressure sensor 206, an atmospheric pressure sensor 221, an intake air temperature sensor 222, a load SW (air conditioning SW) 223, the accelerator opening degree sensor 218, and the crank angle sensor 219 are input into the I/O unit 302. An output signal is transmitted from the CPU 301 to fuel injection valves 317 to 320, ignition coils 321 to 324 and the electrically controlled throttle motor 204 via an output signal driver 303.

Figure 4:
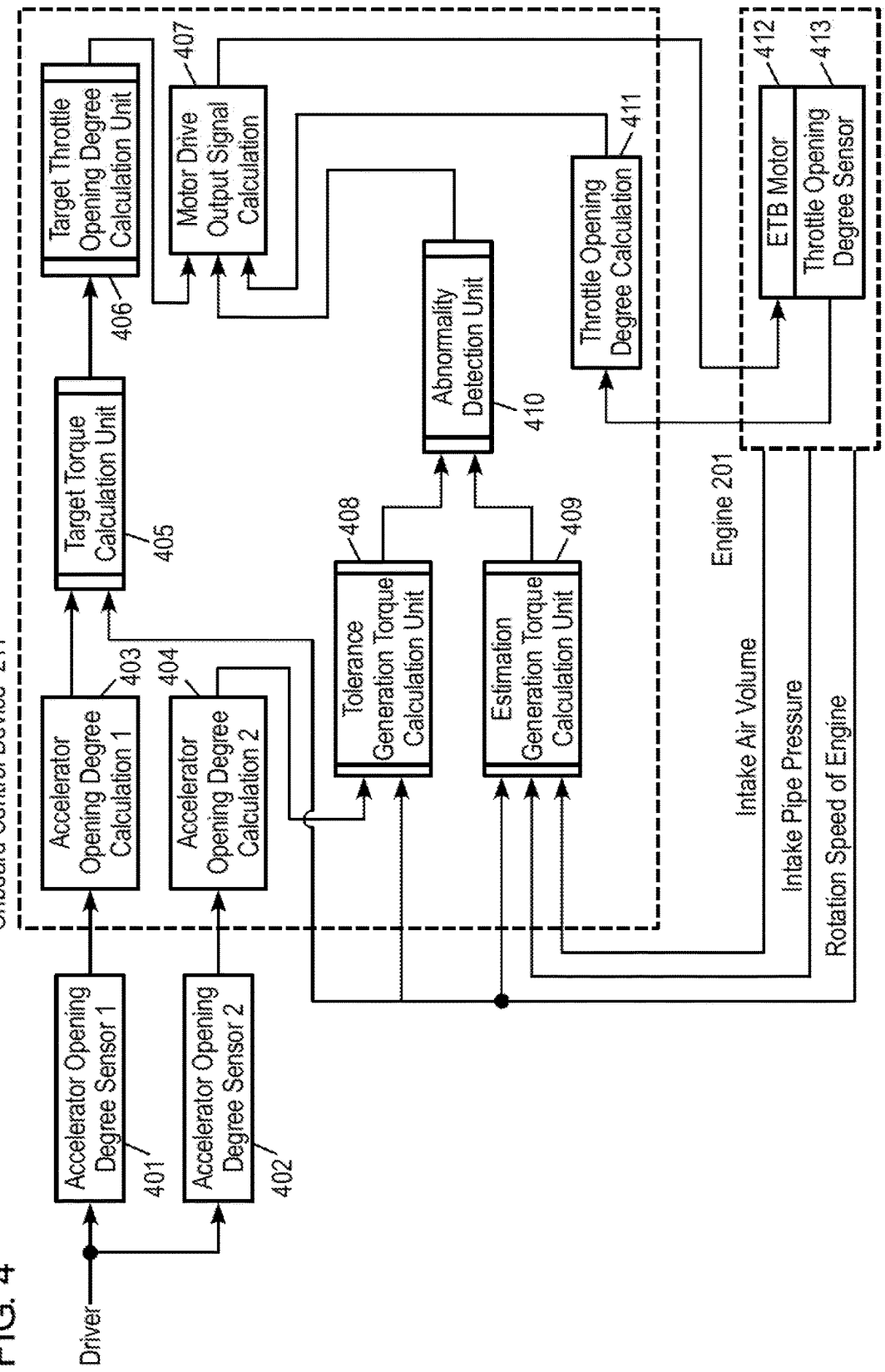
FIG. 4 is a control block diagram of abnormality detection of the engine by the onboard control device according to the embodiment of the invention.

FIG. 4 is a control block diagram of the abnormality detection of the engine by the onboard control device according to the embodiment of the invention. An accelerator opening degree sensor 1 and an accelerator opening degree sensor 2 sense an accelerator operation amount that is operated by an intension of the driver (blocks 401 and 402). The drive manipulated variable detection means 101 calculates an accelerator opening degree 1 from the output of the accelerator opening degree sensor 1 in a block 403. Moreover, the drive manipulated variable detection means 101 may also use an estimation value of the accelerator opening degree.

The target throttle calculation means 109 calculates a torque as a target of the driver from the accelerator opening degree 1 and the rotation speed of the engine in a block 405. The target throttle opening degree calculation means 109 converts the target torque into a required throttle opening degree (target throttle opening degree) in a block 406 and the electrically controlled throttle control means 115 calculates a motor drive output signal from the required throttle opening degree in a block 407.

The electrically controlled throttle motor 204 (see FIG. 3) of a block 412 is operated by the output signal and the throttle mounted on an intake system of the engine 201 is opened and closed. The throttle opening degree sensor 215 of a block 413 senses an operation amount of the throttle and actual throttle opening degree calculation means (not illustrated) calculates an actual throttle opening degree in a block 411. The calculated actual throttle opening degree is compared to a request throttle opening degree in the block 407 and the electrically controlled throttle control means 115 feedback-controls the motor drive output signal so that the actual throttle opening degree matches the required throttle opening degree.

Next, the drive manipulated variable detection means 101 calculates an accelerator opening degree 2 in the block 404 from the output sensed in the block 402. Moreover, the drive manipulated variable detection means 101 may use the estimation value of the accelerator opening degree. The tolerance generation torque calculation means 110 calculates the tolerance generation torque and also calculates a rate of change in a predetermined time in the block 408 from the accelerator opening degree 2 and the rotation speed of the engine. In addition, in the block 409, the estimation generation torque calculation means 111 estimates a torque generated by the engine 201 and also calculates the rate of change in the estimation generation torque of the predetermined time from an intake air amount, an intake pipe pressure, and the rotation speed of the engine indicating a state of the engine 201.

Finally, the abnormality detection means 112 monitors in a block 410 whether or not a torque equal to or greater than the target torque that is intended by the driver is generated from the tolerance generation torque or the rate of change in the predetermined time of the tolerance generation torque calculated in the block 408, and the estimation generation torque or the rate of change in the predetermined time of the estimation generation torque calculated in the block 409. The electrically controlled throttle motor 204 is driven or a mechanical throttle is operated by stopping the drive of the electrically controlled throttle motor 204 so that the throttle is operated in a direction in which the output of the engine 201 is suppressed at an abnormal time (fail-safe process).

Figure 5:
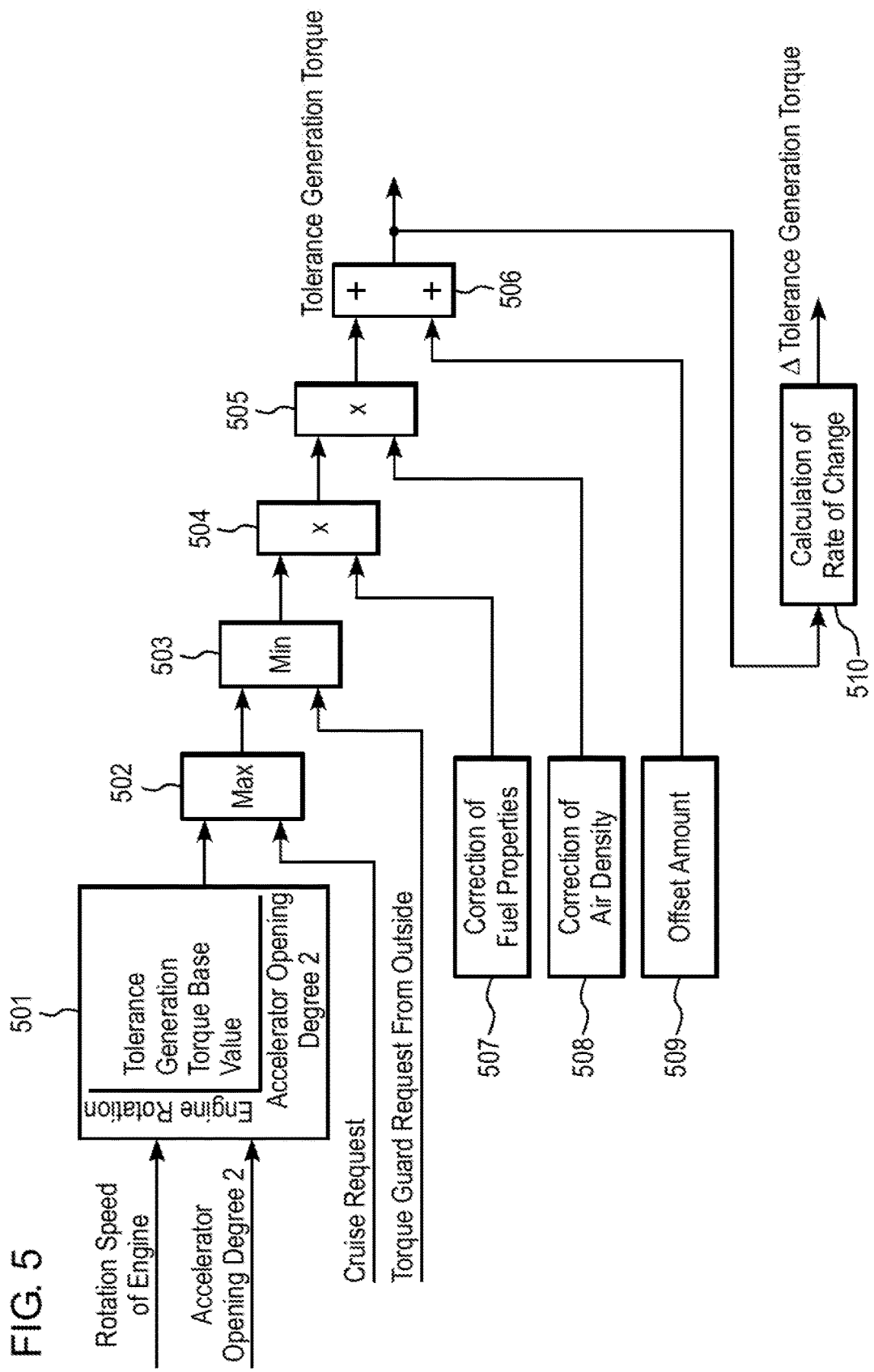
FIG. 5 is a diagram illustrating details of a calculation procedure of a rate of change in a tolerance generation torque by tolerance generation torque calculation means illustrated in FIG. 1.

FIG. 5 is a diagram illustrating details of a calculation procedure of the rate of change in the tolerance generation torque by the tolerance generation torque calculation means. The tolerance generation torque calculation means 110 calculates a base value of the tolerance generation torque from the rotation speed of the engine and the accelerator opening degree 2 in a block 501. The tolerance generation torque calculation means 110 corresponds to the calculation of the tolerance generation torque during cruise by selecting a larger value out of the base value of the tolerance generation torque and a torque of a cruise request in a block 502. In addition, the tolerance generation torque calculation means 110 selects a smaller value out of a torque guard request from the outside and the tolerance generation torque calculated in the block 502, and calculates the tolerance generation torque in consideration of a torque down request from the outside in a block 503.

The tolerance generation torque calculation means 110 calculates a correction coefficient for considering an amount of change in a generation torque of the engine 201 by fuel properties in a block 507. In the block 504, the tolerance generation torque calculation means 110 multiplies the correction coefficient by the tolerance generation torque calculated in the block 503 and calculates the tolerance generation torque corresponding to a change in the generation torque by the fuel properties.

The tolerance generation torque calculation means 110 calculates the correction coefficient for considering the amount of change in the generation torque of the engine 201 by an air density in a block 508. In a block 505, the tolerance generation torque calculation means 110 multiplies the correction coefficient by the tolerance generation torque calculated in the block 504 and calculates the tolerance generation torque corresponding to the change in the generation torque by the air density. The tolerance generation torque calculation means 110 considers a calculation error of the estimation generation torque described below and adds an offset amount calculated in a block 509 to the tolerance generation torque calculated in the block 505 so that the estimation generation torque does not exceed the tolerance generation torque at a normal time in a block 506.

Finally, the tolerance generation torque calculation means 110 calculates the rate of change in the predetermined time of the tolerance generation torque in a block 510. Here, the calculated tolerance generation torque or a rate of change (Δtolerance generation torque) in the predetermined time of the tolerance generation torque is used in the abnormality detection described below. Moreover, Δtolerance generation torque corresponds to the "rate of change in drive manipulation" of the present invention.

FIG. 6 is a diagram illustrating details of a calculation procedure of the rate of change in the estimation generation torque by the estimation generation torque calculation means. The estimation generation torque calculation means 111 calculates the base value of the estimation generation torque at a time of high-octane gasoline from the rotation speed of the engine and the engine load in a block 601. The estimation generation torque calculation means 111 similarly calculates the base value of the estimation generation torque at a time of regular gasoline from the rotation speed of the engine and the engine load in a block 602. The estimation generation torque calculation means 111 selects the base value of the estimation generation torque from a result of a gasoline property determination that is used, that is, a determination result whether the gasoline is the high-octane gasoline or the regular gasoline in a block 603.

The estimation generation torque calculation means 111 multiplies ignition efficiency by the base value of the estimation generation torque selected in the block 603 in consideration of an influence of the ignition timing in a block 604. For example, if the ignition timing is used as a reference when the base value of the estimation generation torque is measured, in a case in which it is an ignition timing on a retard side with respect to the ignition timing of the reference, the ignition efficiency is smaller than 1.0 and, as a result, the estimation generation torque is calculated to be small.

The estimation generation torque calculation means 111 multiplies a value of a fuel injection amount correction by the estimation generation torque, which is calculated in the block 604, in a block 605. Here, the fuel injection amount correction is multiplied by the correction value as 0 during fuel cut and thereby the estimation generation torque is set to 0 during the fuel cut. This is performed in order to match a phenomenon that the generation torque of the engine becomes 0 when the fuel is not injected.

The estimation generation torque calculation means 111 calculates a load torque from the rotation speed of the engine and the intake pipe pressure in a block 607, subtracts the load torque from the estimation generation torque, which is calculated in the block 605, in a block 606, and calculates the estimation generation torque as a shaft torque of the engine 201. Finally, the estimation generation torque calculation means 111 calculates the rate of change in the predetermined time of the estimation generation torque in a block 608. Here, the calculated estimation generation torque or the rate of change (Δestimation generation torque) in the predetermined time of the estimation generation torque is used for the abnormality detection described below. Moreover, Δestimation generation torque corresponds to the "rate of change in the operating state" of the present invention.

FIG. 7 is a diagram illustrating details of an abnormality determination procedure of the engine by the abnormality detection means 112. The abnormality detection means 112 calculates a difference between the rate of change (Δestimation generation torque) in the predetermined time of the estimation generation torque described above and the rate of change (Δtolerance generation torque) in the predetermined time of the tolerance generation torque in a block 701. Thereafter, the abnormality detection means 112 compares a threshold calculated in a block 702 with the difference in a block 703 and determines whether Δestimation generation torque is greater than Δtolerance generation torque. The abnormality detection means 112 measures a time at which Δestimation generation torque is greater than Δtolerance generation torque and determines as abnormality in a case in which the time is greater than the predetermined time in a block 704. Moreover, instead of the difference between Δestimation generation torque and Δtolerance generation torque, a ratio of both is calculated and the abnormality determination may be performed on the basis of the calculation result.

FIGS. 8(*a*) and 8(*b*) illustrate an example of a relationship between a difference (difference of the Δtorque) between the rate of change (Δestimation generation torque) in the predetermined time of the estimation generation torque and the rate of change (Δtolerance generation torque) in the predetermined time of the tolerance generation torque and an acceleration G of the vehicle.

Figure 8A:
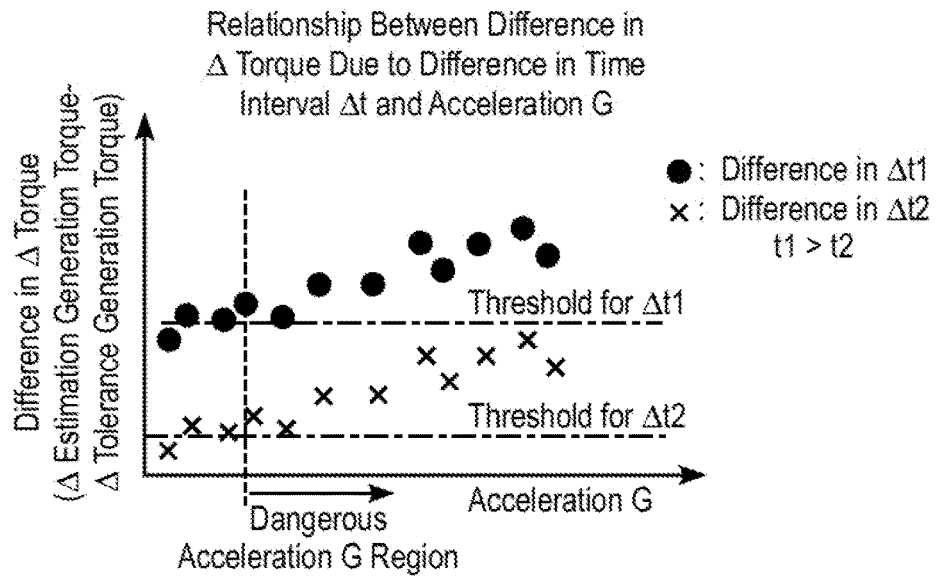
FIG. 8A is a graph illustrating a relationship between a difference in a Δtorque due to a difference in a time interval Δt and an acceleration G of the vehicle.

FIG. 8(a) illustrates a relationship between the difference of the Δtorque and the acceleration G in a case in which the throttle valve is opened in a stepwise manner in a state where a gear of a transmission is fixed and a state of a predetermined rotation speed of the engine is held. FIG. 8(a) illustrates a difference of the Δtorque in a case in which time intervals of an output of the rate of change are t1 and t2, and the interval (Δt1) of t1 is greater than the interval (Δt2) of t2. The acceleration G of a case in which the opening degree of the throttle valve 203 is large is greater than that of a case in which the opening degree of the throttle valve 203 is small. Since the Δt1 is greater than the Δt2, the difference of the Δtorque at the time of generation of the predetermined acceleration G is greater in a case in which the time interval is the Δt1 than in a case in which the time interval is the Δt2. That is, even if the same acceleration G is provided, the difference of the Δtorque indicates a different value in accordance with the time interval in which the rate of change is calculated. Therefore, if a dangerous state of the vehicle is generated equal to or greater than the predetermined acceleration G (for example, 0.1 G), it is necessary to set a threshold for determining the dangerous state of the vehicle for each of the Δt1 and the Δt2.

Figure 8B:
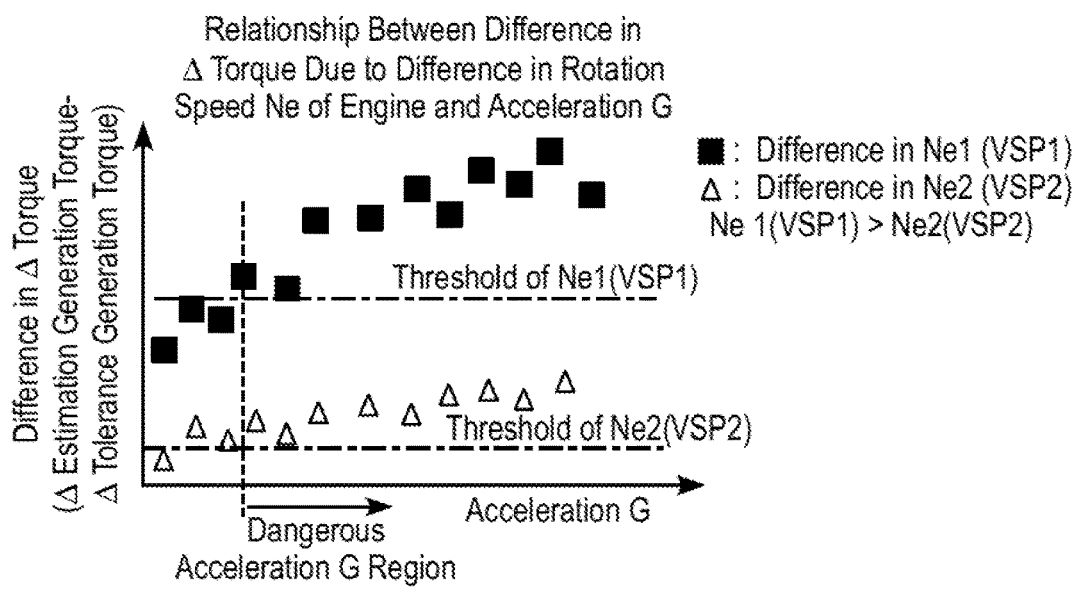
FIG. 8B is a graph illustrating a relationship between a difference in a Δtorque due to a difference in a rotation speed Ne of the engine and the acceleration G of the vehicle.

In addition, FIG. 8(b) illustrates a result in which the time interval is fixed to one state and a state of the rotation speed of the engine that is held as described above is confirmed in two types (Ne1 and Ne2), unlike FIG. 8 (a). As illustrated in FIG. 8(b), the Ne1 is higher than the Ne2 and if vehicle speeds are VSP1 and VSP2 in the Ne1 and Ne2 for fixing the gear, a difference of the Δtorque of the VSP1 is greater than that of the Δtorque of the VSP2.

The difference of the Δtorque at the time of the generation of the predetermined acceleration G is greater in a case of the Ne1 (VSP1 in which the vehicle speed is large) in which the state of the rotation speed of the engine is high than in a case of the Ne2. Therefore, if the dangerous state of the vehicle is generated equal to or greater than the predetermined acceleration G (for example, 0.1 G), it is necessary to set a threshold for determining the dangerous state of the vehicle for each of the Ne1 (VSP1) and Ne2 (VSP2).

Figure 8C:
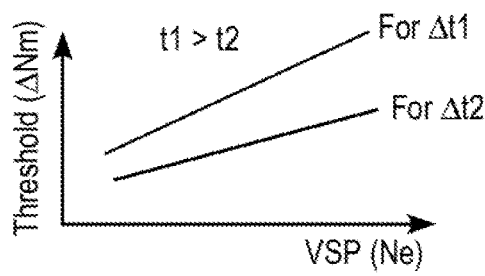
FIG. 8C is a graph illustrating a relationship between a threshold and a speed VSP (rotation speed Ne of the engine) of the vehicle.

From the above, as illustrated in FIG. 8(c), the threshold is necessary to be set to an appropriate value in accordance with the rotation speed (Ne) of the engine or the vehicle speed (VSP) for each time interval (each of the Δt1 and the Δt2).

FIGS. 9(a) and 9(b) are charts illustrating a behavior of abnormality detection by the onboard control device according to the embodiment of the invention. FIG. 9(a) is a chart illustrating a behavior at a normal time. A line 901 indicates a behavior of the accelerator opening degree indicating an accelerator depressing amount of the driver. In this figure, the accelerator opening degree is illustrated in cases in which the vehicle is accelerating, is at a constant speed, and is decelerating. A line 902 indicates a behavior of the tolerance generation torque. The tolerance generation torque is large as the accelerator opening degree is large (acceleration state) and is small as the accelerator opening degree is small (deceleration state).

A line 903 indicates a behavior of the estimation generation torque. The estimation generation torque causes the behavior during the acceleration and deceleration to be delayed due to an influence of a response delay of the intake air and the like with respect to the operation of the accelerator opening degree. Moreover, since the abnormality detection is performed from a difference between the tolerance generation torque and the estimation generation torque, for the tolerance generation torque, a filtering process is performed to prevent erroneous detection and to match a phase to the estimation generation torque.

A line 904 indicates a behavior of the rate of change (Δtolerance generation torque) in the tolerance generation torque for unit time. A line 905 indicates a behavior of the rate of change (Δestimation generation torque) in the estimation generation torque per unit time. A line 906 indicates a behavior of the rate of change in the difference between Δestimation generation torque and Δtolerance generation torque described above. A line 907 determines abnormality in a case in which a threshold 1 is for the abnormality detection and a time exceeding the threshold 1 is continued equal to or greater than a predetermined time. Consecutive time conditions are provided to prevent the erroneous detection because it is difficult to completely match the tolerance generation torque and the estimation generation torque after the filtering process even at a normal time.

FIG. 9(b) is a chart illustrating a behavior at an abnormal time. A line 911 indicates a behavior of the accelerator opening degree indicating the accelerator depressing amount of the driver, a line 912 indicates a behavior of the tolerance generation torque, and they are operations similar to FIG. 9(a). A line 913 indicates a behavior of the estimation generation torque and it can be seen from FIG. 9(b) that the estimation generation torque is increased from A time point due to abnormal occurrence.

A line 914 indicates a behavior of the rate of change (Δtolerance generation torque) in the tolerance generation torque for unit time and a line 915 indicates a behavior of the rate of change (Δestimation generation torque) in the estimation generation torque for unit time. As illustrated in the figure, the torque is increased due to the abnormal occurrence from the A time point, a difference between Δestimation generation torque and Δtolerance generation torque of a line 916 is also increased and is equal to or greater than a threshold 2 of a line 918.

Figure 10A:
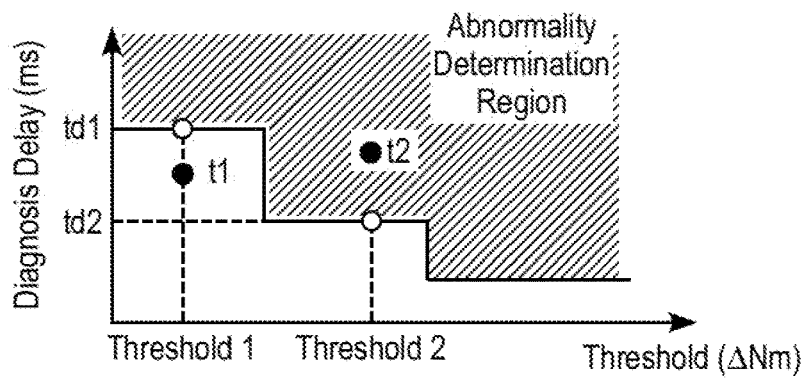
FIG. 10A is a graph illustrating a relationship between a diagnosis delay and a threshold.

The threshold 2 is a value which is greater than a threshold 1 of a line 917. Therefore, as illustrated in FIG. 10(a), the consecutive time conditions of each of the threshold 1 and the threshold 2 are set such that the consecutive time (diagnosis delay) of the threshold 2 is shorter than that of the threshold 1. Specifically, in a case of the threshold 1, the diagnosis delay=td1, in a case of the threshold 2, the diagnosis delay=td2, and td2 is a value shorter than that of td1. As described above, the diagnosis delay is set to prevent the erroneous detection of the abnormality. In addition, the diagnosis delay is set in accordance with the threshold because as the difference between Δestimation generation torque and Δtolerance generation torque is large, it likely to be an abnormal state, the abnormality determination is quickly performed, and the abnormal state is quickly shifted to a safe state, and then safety of the vehicle is increased.

A line 919 indicates a behavior of an abnormality determination flag and, in FIG. 9(b), the line 916 exceeds the threshold 2 from the A time point and the abnormality determination flag rises at a time point elapsed the td2 time. In a case in which a time when the line 916 exceeds the threshold 1 is t1 and a time when the line 916 exceeds the threshold 2 is t2, a relationship between the times td1 and td2 of the diagnosis delay and t1 and t2 of the embodiment is a relationship as illustrated in FIG. 10(a) and as the threshold is large, the time of the diagnosis delay is set to be small in a stepwise manner. Specifically, the diagnosis delay is set to td1 with respect to the threshold 1 and the diagnosis delay is set to td2 with respect to the threshold 2 that is greater than the threshold 1.

Therefore, in FIG. 9(b), since the time when the line 916 exceeds the threshold 1 is t1, but is lower than the time td1 of the diagnosis delay that is set with respect to the threshold 1, the abnormality is not detected in a range of t1. On the other hand, the time when the line 916 exceeds the threshold 2 is t2, but exceeds the time td2 of the diagnosis delay that is set with respect to the threshold 2. Therefore, the abnormality is detected after the time td2 is elapsed since the line 916 exceeds the threshold 2.

Figure 10B:
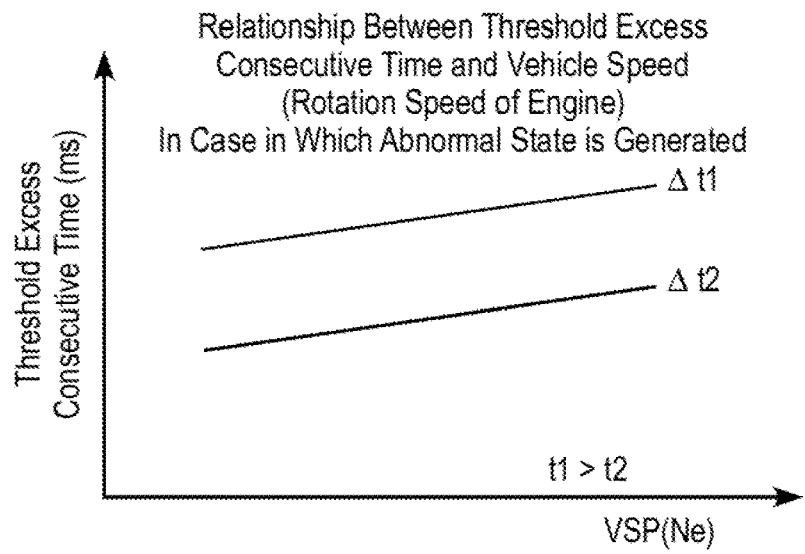
FIG. 10B is a graph illustrating a relationship between a threshold excess consecutive time and the speed VSP (rotation speed Ne of the engine) of the vehicle in a case in which an abnormality state is generated.

FIG. 10(b) is a graph illustrating a relationship between a time (consecutive time) T exceeding the threshold that is the difference between Δestimation generation torque and Δtolerance generation torque, a vehicle speed (VSP) at a time when the abnormality occurs, or the rotation speed (Ne) of the engine in a case in which the abnormality (throttle is opened in a stepwise manner) actually occurs.

Figure 10C:
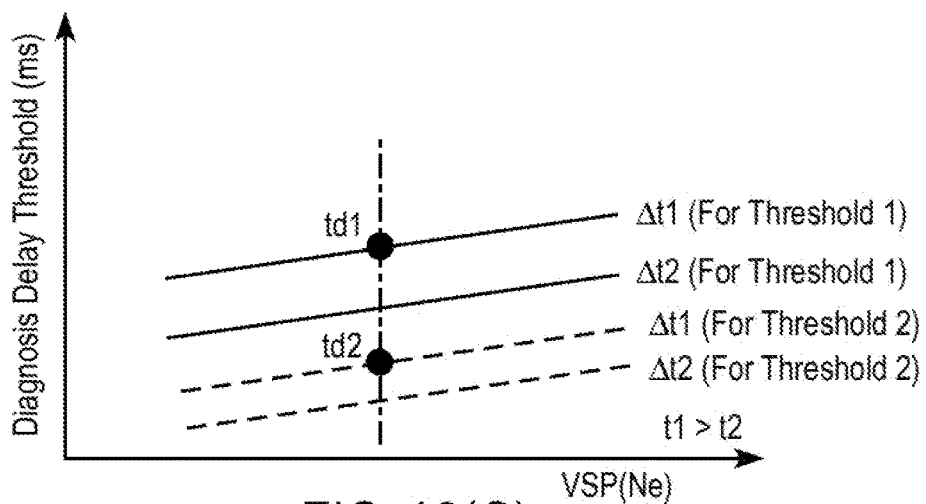
FIG. 10C is a graph illustrating a relationship between the diagnosis delay and the speed VSP (rotation speed Ne of the engine) of the vehicle.

As illustrated in FIG. 10(b), as the VSP or Ne is increased, the time (T) exceeding the threshold has a tendency to be longer. In addition, in a case in which time intervals of calculation of the rate of change are t1 and t2, the time (T) exceeding the threshold has a tendency to be longer in a case of the difference between Δestimation generation torque and Δtolerance generation torque at t1 in which the time interval is long than in a case of the difference at t2. Therefore, in the embodiment, as illustrated in FIG. 10(c), the threshold of the diagnosis delay is set to be large as the VSP or Ne is large. In addition, in the threshold of the difference between Δestimation generation torque and Δtolerance generation torque, the threshold (the threshold 2) in which the abnormality is surely determined and the threshold 1 of others may be separately set, and thereby the abnormality is further accurately determined.

Figure 11:
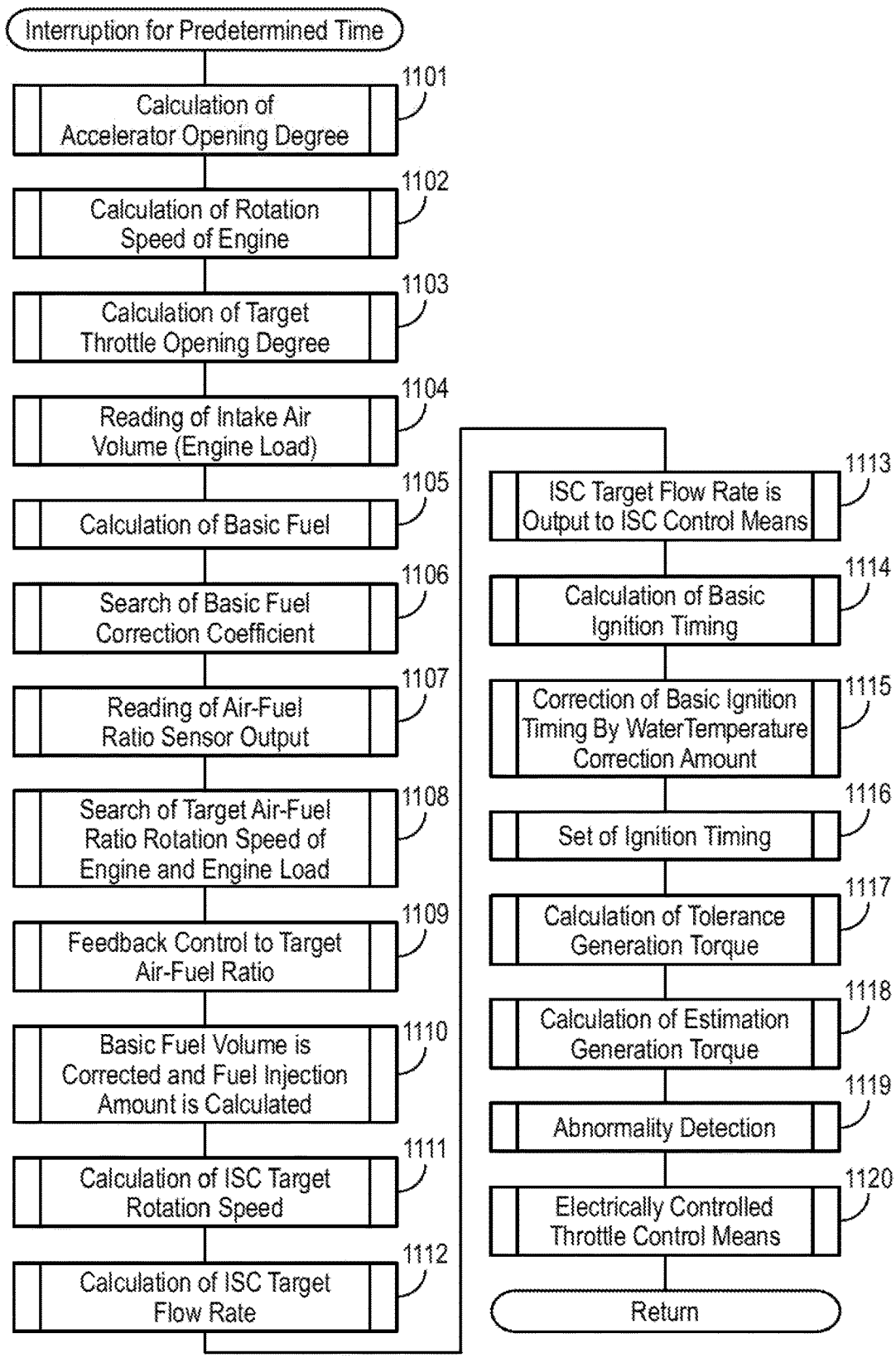
FIG. 11 is a control flowchart of the onboard control device according to the embodiment of the invention.

FIG. 11 is a control flowchart of the onboard control device according to the embodiment of the invention. In step 1101, an accelerator opening degree rate is converted from an output voltage of the accelerator opening degree sensor 218 and is read. In step 1102, the electrical signal of the crank angle sensor 219, mainly the number of inputs of the pulse signal change for unit time is counted and the rotation speed of the engine is calculated by a calculating process. In step 1103, a throttle angle is converted from the output voltage of the throttle opening degree sensor 215 and is read.

In step 1104, the air flow rate that is obtained by converting from the output voltage of the thermal air flow meter 202 into a voltage flow rate is read. In step 1105, the basic fuel volume is calculated from the rotation speed of the engine and the intake air flow rate (engine load). In step 1106, a basic fuel correction coefficient is map-searched from the rotation speed of the engine and the engine load. In step 1107, an actual air-fuel ratio of which an air-fuel ratio is converted from the output voltage of the air-fuel ratio sensor 211 is read.

In step 1108, a target air-fuel ratio is map-searched from the rotation speed of the engine and the engine load. In step 1109, a feedback control to the target air-fuel ratio is performed in the target air-fuel ratio and the actual air-fuel ratio, and calculates the air-fuel ratio correction coefficient is calculated. In step 1110, the basic fuel volume is corrected by the basic fuel correction coefficient and the air-fuel ratio correction coefficient by the feedback control, and the fuel injection amount is calculated. In step 1111, a target value of an idle rotation speed is calculated. In step 1112, an ISC target flow rate that is capable of realizing a target value of the idle rotation speed is calculated.

In step 1113, the ISC target flow rate is output to ISC control means. In step 1114, the basic ignition timing is calculated by the rotation speed of the engine and the engine load. In step 1115, correction such as water temperature correction is performed in the basic ignition timing. In step 1116, the ignition timing that is corrected as described above is set. In step 1117, the tolerance generation torque is calculated and in step 1118, the estimation generation torque is calculated. In step 1119, the abnormality determination is performed from the tolerance generation torque and the estimation generation torque.

In step 1120, a final throttle opening degree is controlled from the accelerator opening degree, a required opening degree from the target torque calculated from the rotation speed of the engine, and a required opening degree from the ISC control means. In addition, even in a case in which the abnormality is determined in step 1119, the throttle opening degree is controlled in step 1120.

Figure 12:
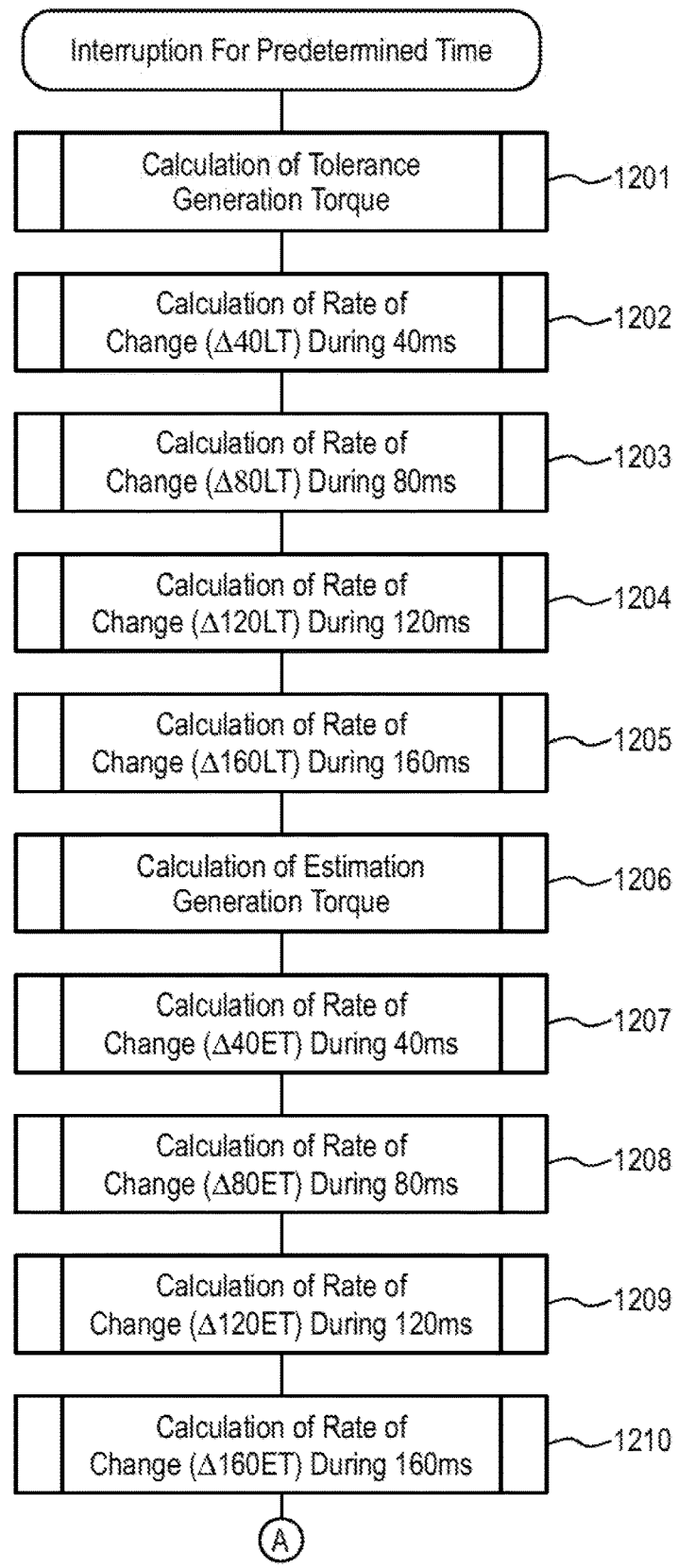
FIG. 12 is a flowchart illustrating details of a part of a process illustrated in FIG. 11.

FIG. 12 is a flowchart illustrating details of the calculation of the tolerance generation torque performed in step 1117 and the calculation of the estimation generation torque performed in step 1118 of FIG. 11. In step 1201, the tolerance generation torque is calculated. Thereafter, in each of step 1202 to step 1205, each rate of change (Δ40 LT, Δ80 LT, Δ120 LT, and Δ160 LT) in the tolerance generation torque during 40 ms, during 80 ms, during 120 ms, and during 160 ms is calculated. In step 1206, the estimation generation torque is calculated. Thereafter, in each of step 1207 to step 1210, each rate of change (Δ40 ET, Δ80 ET, Δ120 ET, and Δ160 ET) in the estimation generation torque during 40 ms, during 80 ms, during 120 ms, and during 160 ms is calculated.

Figure 13:
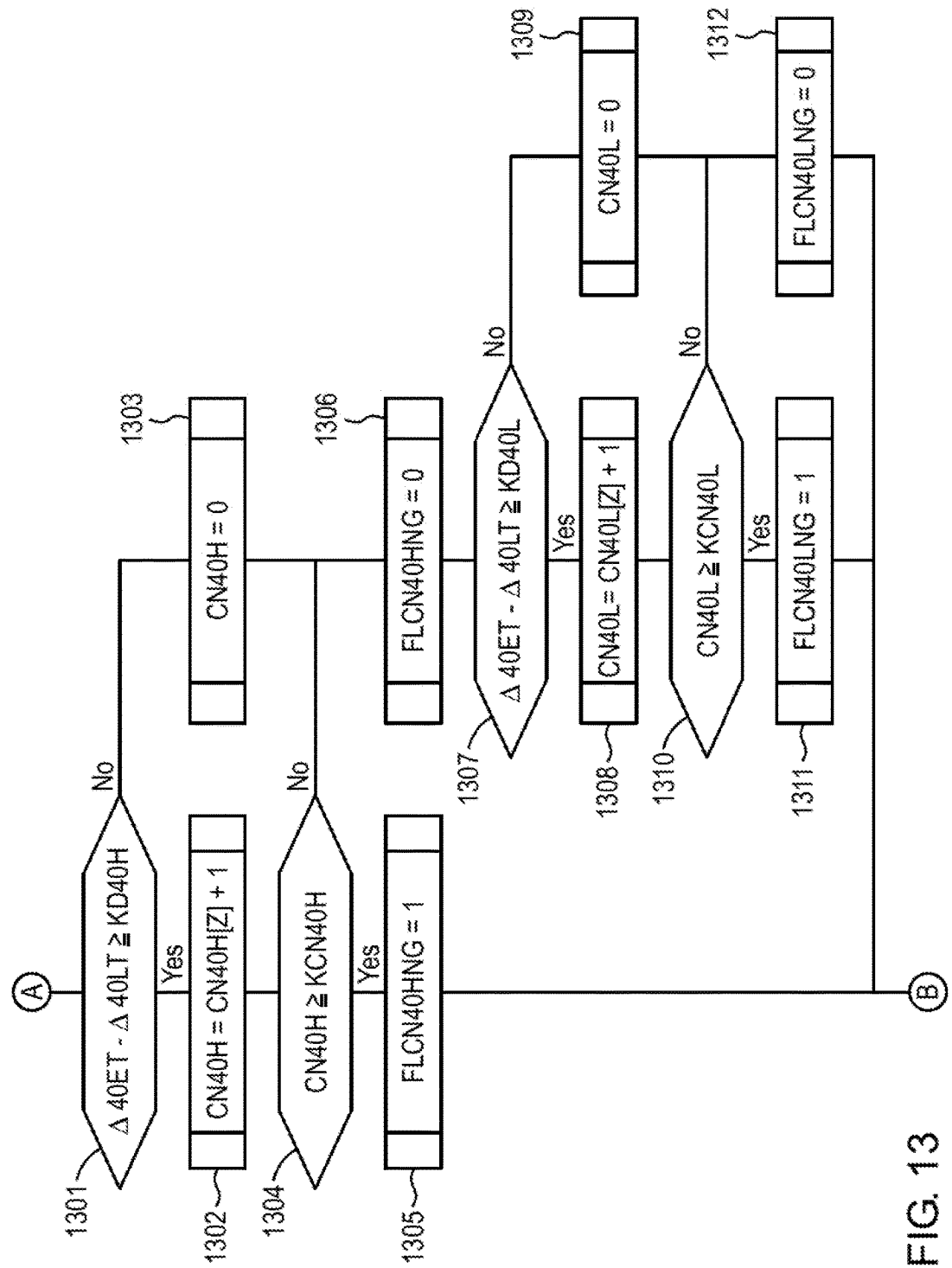
FIG. 13 is a flowchart illustrating details of a continuation of FIG. 12.

FIGS. 13, 14, 15, 16, and 17 are flowcharts illustrating details of the abnormality detection of step 1119 of FIG. 11. FIG. 13 is a flow for determining the abnormality from the rate of change (Δ40 ET) in the estimation generation torque and the rate of change (Δ40 LT) in the tolerance generation torque during 40 ms. In step 1301, it is checked whether a difference between the rate of change (Δ40 ET) in the estimation generation torque and the rate of change (Δ40 LT) in the tolerance generation torque during 40 ms is greater than a predetermined threshold (KD40H). If a check result is Yes, the procedure proceeds to step 1302 and a counter (CN40H) is counted up. Thereafter, in step 1304, it is checked whether the CN40H is equal to or greater than a predetermined threshold (KCN40H) for counter check.

Figure 14:
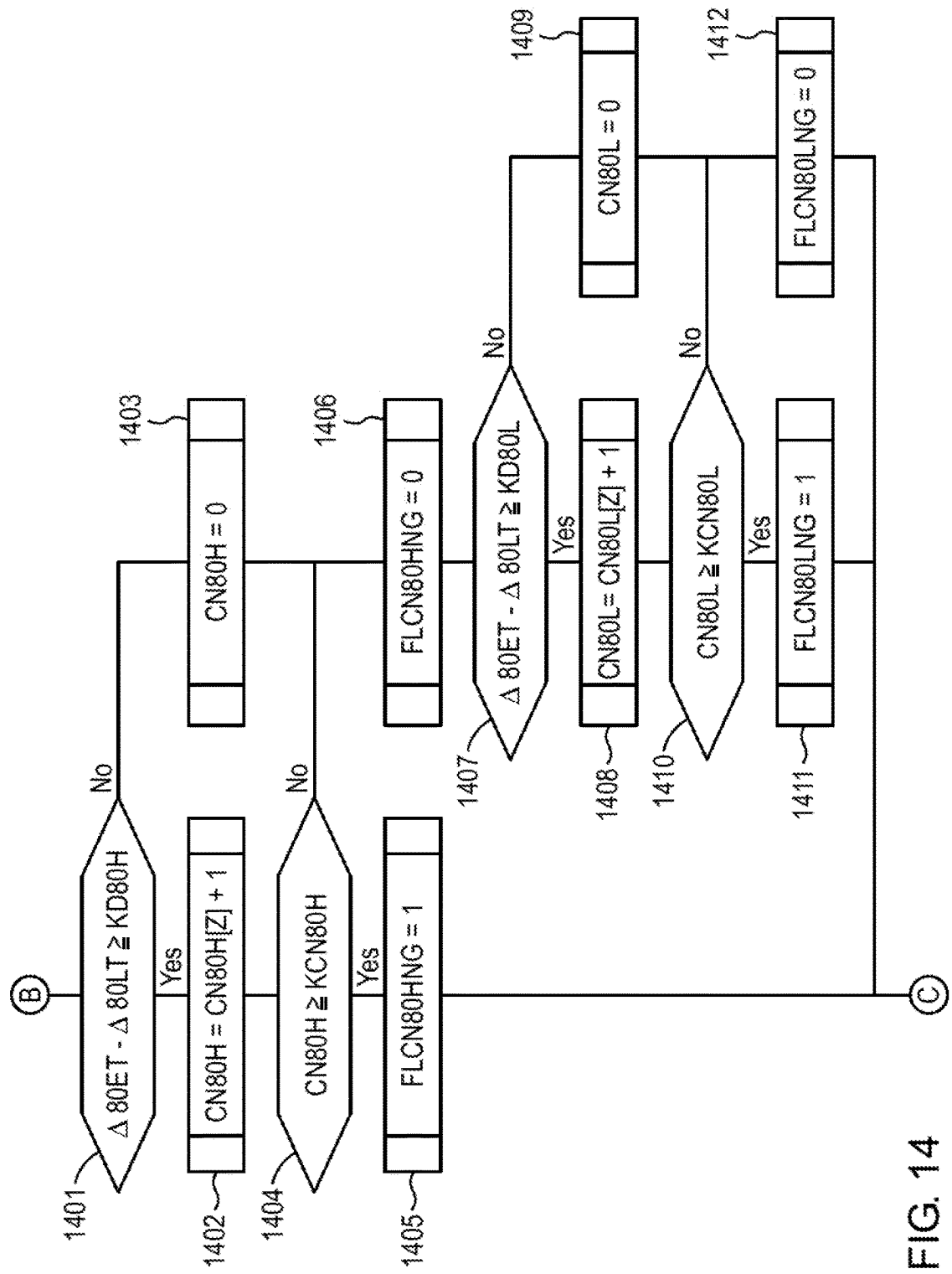
FIG. 14 is a flowchart illustrating details of a continuation of FIG. 13.

If a check result is Yes, in step 1305, an abnormality flag (FLCN40HNG) is 1 and the procedure proceeds to the flow of FIG. 14. If the result of step 1301 is No, the procedure proceeds to step 1303, CN40H is clear, and the procedure proceeds to step 1306. In addition, similarly, if the result of step 1304 is also No, the procedure proceeds to step 1306, FLCN40HNG is clear, and the procedure proceeds to step 1307.

In step 1307, similar to step 1301, it is checked whether a difference between Δ40 ET and Δ40 LT is greater than a predetermined threshold (KD40L). Here, the threshold (KD40L) is set to a value which is smaller than the threshold (KD40H) used in step 1301. The threshold (KD40L) in step 1307 is set for determination in a case where the abnormality occurs but it is difficult to determine the normal state, while the threshold (KD40H) in step 1301 is used to reliably detect the abnormal state. Thus, a threshold (KCN40L) compared to an abnormality counter (CN40L) in step 1310 described below is set to a value which is greater than the threshold (KCN40H) used in step 1304 and determination of the abnormal state is reliably performed.

If the result of step 1307 is Yes, the procedure proceeds to step 1308 and a counter (CN40L) is counted up. Thereafter, in step 1310, it is checked whether CN40L is equal to or greater than the predetermined threshold (KCN40L) for the counter check. If the check result is Yes, in step 1311, an abnormality flag (FLCN40LNG) is 1 and the procedure proceeds to the flow of FIG. 14. If the result of step 1307 is No, the procedure proceeds to step 1309, CN40L is clear, and the procedure proceeds to step 1312. In addition, similarly, if the result of step 1310 is also No, the procedure proceeds to step 1312, FLCN40LNG is clear, and the procedure proceeds to the flow of FIG. 14.

FIG. 14 is a flow for determining the abnormality from the rate of change (Δ80 ET) in the estimation generation torque and the rate of change (Δ80 LT) in the tolerance generation torque during 80 ms. In step 1401, it is checked whether a difference between the rate of change (Δ80 ET) in the estimation generation torque and the rate of change (Δ80 LT) in the tolerance generation torque during 80 ms is greater than a predetermined threshold (KD80H). If a check result is Yes, the procedure proceeds to step 1402 and a counter (CN80H) is counted up.

Thereafter, in step 1404, it is checked whether the CN80H is equal to or greater than a predetermined threshold (KCN80H) for counter check. The check result is Yes, in step 1405, an abnormality flag (FLCN80HNG) is 1 and the procedure proceeds to the flow of FIG. 15. If the result of step 1401 is No, the procedure proceeds to step 1403, CN80H is clear, and the procedure proceeds to step 1406. In addition, similarly, if the result of step 1404 is also No, the procedure proceeds to step 1406, FLCN80HNG is clear, and the procedure proceeds to step 1407.

In step 1407, similar to step 1401, it is checked whether a difference between Δ80 ET and Δ80 LT is greater than a predetermined threshold (KD80L). Here, the threshold (KD80L) is set to a value which is smaller than the threshold (KD80H) used in step 1401. In addition, a threshold (KCN80L) compared to an abnormality counter (CN80L) in step 1410 described below is set to a value which is greater than the threshold (KCN80H) used in step 1404. This is the same reason as that in FIG. 13 described above.

If the result of step 1407 is Yes, the procedure proceeds to step 1408 and a counter (CN80L) is counted up. Thereafter, in step 1410, it is checked whether CN80L is equal to or greater than the predetermined threshold (KCN80L) for the counter check. If the check result is Yes, in step 1411, an abnormality flag (FLCN80LNG) is 1 and the procedure proceeds to the flow of FIG. 15. If the result of step 1407 is No, the procedure proceeds to step 1409, CN80L is clear, and the procedure proceeds to step 1412. In addition, similarly, if the result of step 1410 is also No, the procedure proceeds to step 1412, FLCN80LNG is clear, and the procedure proceeds to the flow of FIG. 15.

Figure 15:
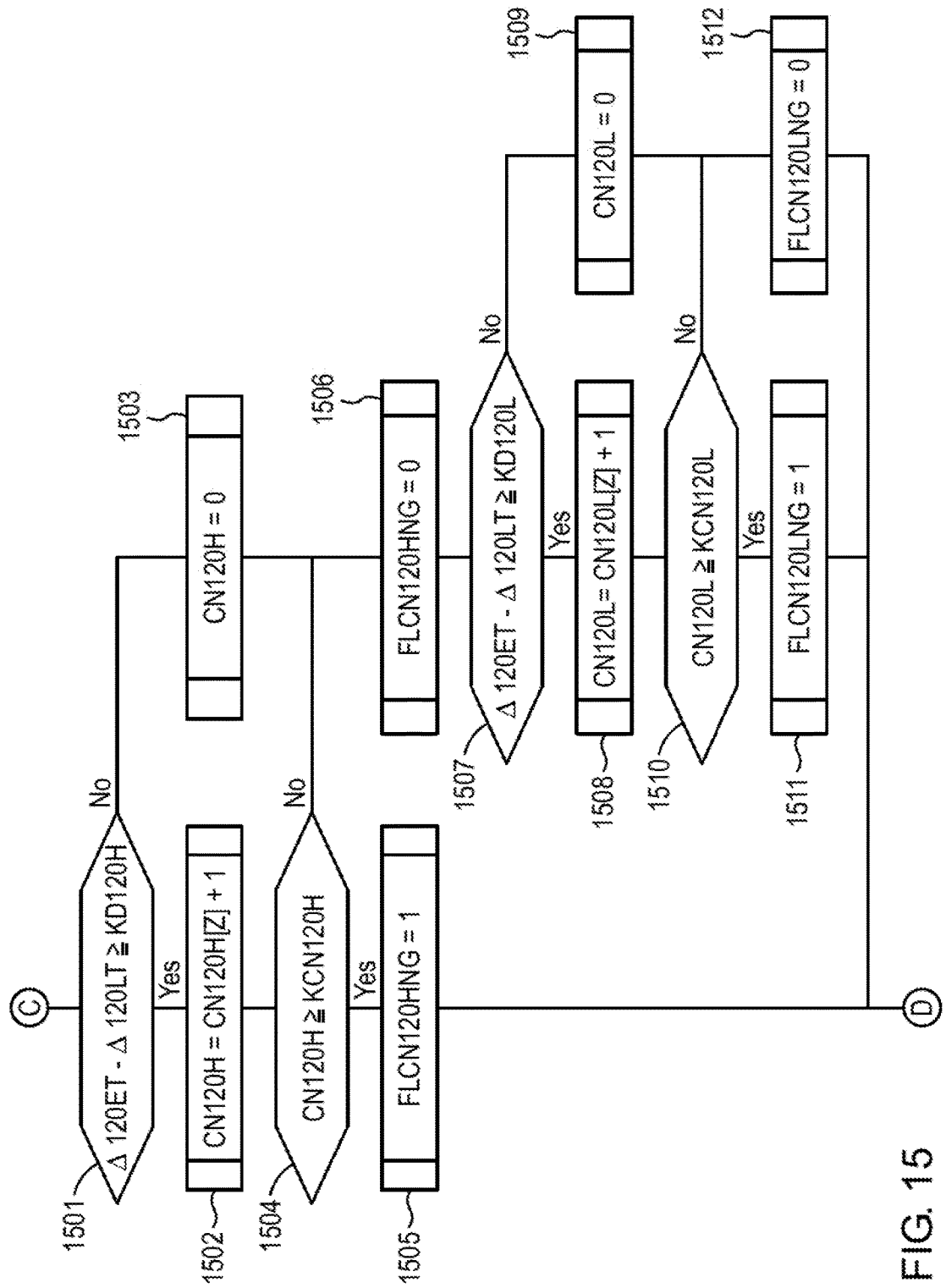
FIG. 15 is a flowchart illustrating details of a continuation of FIG. 14.

FIG. 15 is a flow for determining the abnormality from the rate of change (Δ120 ET) in the estimation generation torque and the rate of change (Δ120 LT) in the tolerance generation torque during 120 ms. In step 1501, it is checked whether a difference between the rate of change (Δ120 ET) in the estimation generation torque and the rate of change (Δ120 LT) in the tolerance generation torque during 120 ms is greater than a predetermined threshold (KD120H). If a check result is Yes, the procedure proceeds to step 1502 and a counter (CN120H) is counted up. Thereafter, in step 1504, it is checked whether CN120H is equal to or greater than a predetermined threshold (KCN120H) for the counter check. If the check result is Yes, in step 1505, an abnormality flag (FLCN120HNG) is 1 and the procedure proceeds to the flow of FIG. 16.

If the result of step 1501 is No, the procedure proceeds to step 1503, CN120H is clear, and the procedure proceeds to step 1506. In addition, similarly, if the result of step 1504 is also No, the procedure proceeds to step 1506, FLCN120HNG is clear, and the procedure proceeds to step 1507. In step 1507, similar to step 1501, it is checked whether the difference between Δ120 ET and Δ120 LT is greater than the predetermined threshold (KD120L). Here, the threshold (KD120L) is set to a value which is smaller than the threshold (KD120H) used in step 1501.

In addition, a threshold (KCN120L) compared to an abnormality counter (CN120L) in step 1510 described below is set to a value which is greater than the threshold (KCN120H) used in step 1504. This is the same reason as that in FIG. 13 described above. If the result of step 1507 is Yes, the procedure proceeds to step 1508 and the counter (CN120L) is counted up. Thereafter, in step 1510, it is checked whether CN120L is equal to or greater than the predetermined threshold (KCN120L) for the counter check.

Figure 16:
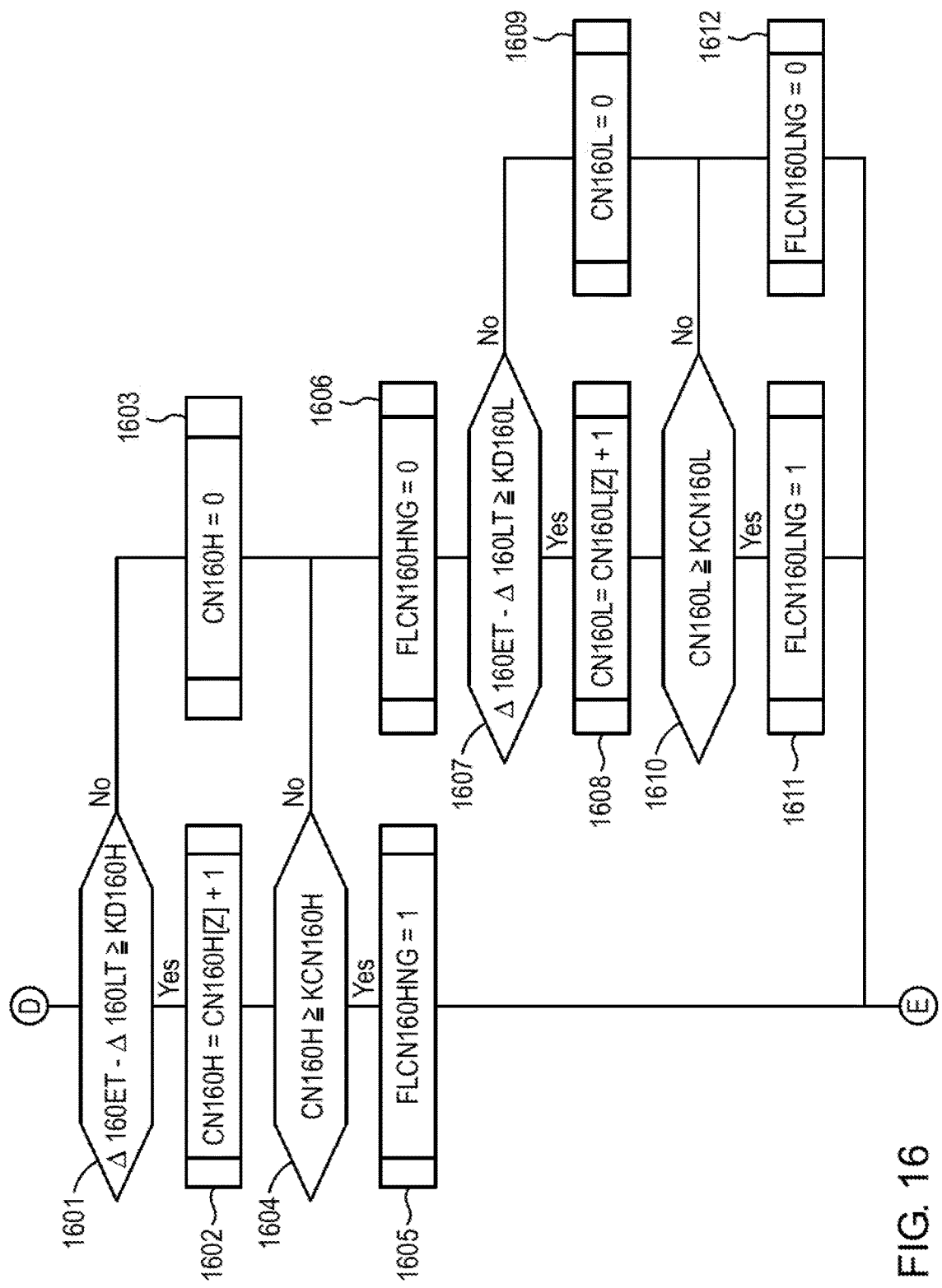
FIG. 16 is a flowchart illustrating details of a continuation of FIG. 15.

If the check result is Yes, in step 1511, the abnormality flag (FLCN120LNG) is 1 and the procedure proceeds to the flow of FIG. 16. If the result of step 1507 is No, the procedure proceeds to step 1509, CN120L is clear, and the procedure proceeds to step 1512. In addition, similarly, if the result of step 1510 is also No, the procedure proceeds to step 1512, FLCN120LNG is clear, and the procedure proceeds to the flow of FIG. 16.

FIG. 16 is a flow for determining the abnormality from the rate of change (Δ160 ET) in the estimation generation torque and the rate of change (Δ160 LT) in the tolerance generation torque during 160 ms. In step 1601, it is checked whether a difference between the rate of change (Δ160 ET) in the estimation generation torque and the rate of change (Δ160 LT) in the tolerance generation torque during 160 ms is greater than a predetermined threshold (KD160H). If a check result is Yes, the procedure proceeds to step 1602 and a counter (CN160H) is counted up. Thereafter, in step 1604, it is checked whether CN160H is equal to or greater than a predetermined threshold (KCN160H) for the counter check.

Figure 17:
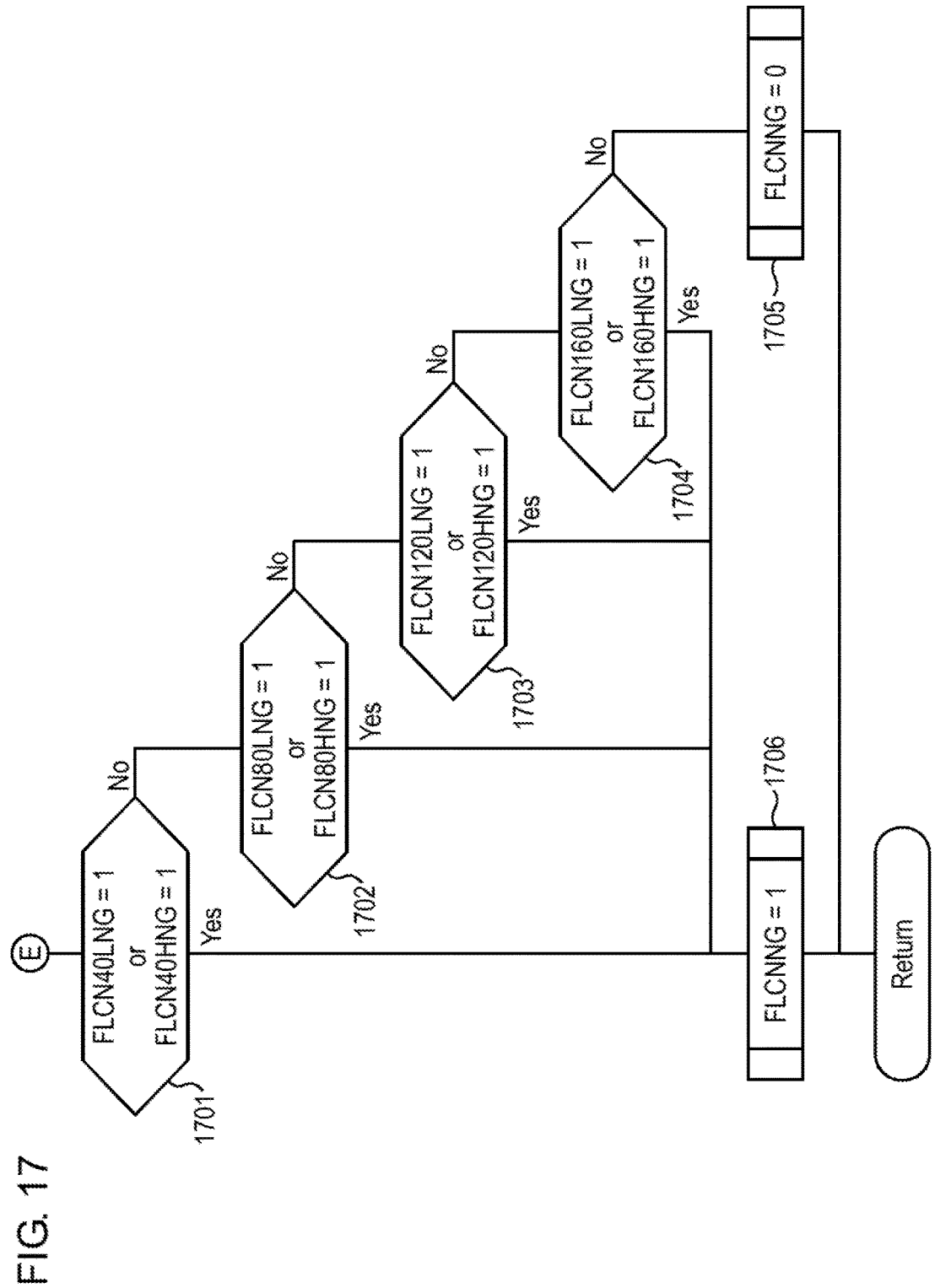
FIG. 17 is a flowchart illustrating details of a continuation of FIG. 16.

If the check result is Yes, in step 1605, an abnormality flag (FLCN160HNG) is 1 and the procedure proceeds to the flow of FIG. 17. If the check result of step 1601 is No, the procedure proceeds to step 1603, CN160H is clear, and the procedure proceeds to step 1606. In addition, similarly, if a result of step 1604 is also No, the procedure proceeds to step 1606, FLCN160HNG is clear, and the procedure proceeds to step 1607. Similar to step 1601, in step 1607, it is checked whether the difference between Δ160 ET and Δ160 LT is greater than a predetermined threshold (KD160L). Here, the threshold (KD160L) is set to a value which is smaller than the threshold (KD160H) used in step 1601.

In addition, a threshold (KCN160L) compared to an abnormality counter (CN160L) in step 1610 described below is set to a value which is greater than the threshold (KCN160H) used in step 1604. This is the same reason as that in FIG. 13 described above. If the result of step 1607 is Yes, the procedure proceeds to step 1608 and the counter (CN160L) is counted up. Thereafter, in step 1610, it is checked whether CN160L is equal to or greater than the predetermined threshold (KCN160L) for the counter check. If the check result is Yes, in step 1611, an abnormality flag (FLCN160LNG) is 1 and the procedure proceeds to the flow of FIG. 17.

If the result of step 1607 is No, the procedure proceeds to step 1609, CN160L is clear, and the procedure proceeds to step 1612. In addition, similarly, if a result of step 1610 is also No, the procedure proceeds to step 1612, FLCN160LNG is clear, and the procedure proceeds to the flow of FIG. 17.

FIG. 17 is a flow for final determination from the abnormality determination flag of the rate of change in each predetermined time of FIGS. 13, 14, 15, and 16. In step 1701, it is determined whether the abnormality determination is satisfied from the rate of change during 40 ms, if it is Yes, the procedure proceeds to step 1706 and a final abnormality determination (FLCNNG=1) is performed. If it is No, the procedure proceeds to step 1702 and it is determined whether the abnormality determination is satisfied from the rate of change during 80 ms.

If it is Yes, the procedure proceeds to step 1706 and the final abnormality determination (FLCNNG=1) is performed. If it is No, the procedure proceeds to step 1703 and it is determined whether the abnormality determination is satisfied from the rate of change during 120 ms. If it is Yes, the procedure proceeds to step 1706 and the final abnormality determination (FLCNNG=1) is performed. If it is No, the procedure proceeds to step 1704 and it is determined whether the abnormality determination is satisfied from the rate of change during 160 ms. If it is Yes, the procedure proceeds to step 1706 and the final abnormality determination (FLCNNG=1) is performed. If it is No, the procedure proceeds to step 1705, it is determined that there is no abnormality (FLCNNG=0), and the flow is completed.

As described above, according to the onboard control device according to the embodiment, the abnormality of the engine is detected from the difference between the rate of change in the tolerance generation torque and the rate of change in the estimation generation torque. Therefore, it is possible to quickly and accurately detect the abnormality of the engine compared to the related art. Thus, it is possible to avoid danger to the driver or not to make the driver feel danger.

Furthermore, according to the embodiment, the abnormality detection of the engine is performed on the basis of the rate of change in the tolerance generation torque and the rate of change in the estimation generation torque for unit time. Therefore, even if a margin is provided in consideration of variations of performances of sensors and configuration components or a change in the performance due to deterioration over time and the like, it is possible to reduce a time for the abnormality detection compared to the related art and to achieve an excellent effect that the abnormality can be detected with high accuracy. In addition, in the embodiment, the rate of change in the tolerance generation torque and the rate of change in the estimation generation torque are calculated in a plurality of time intervals, and a plurality of thresholds, diagnosis delays, and the like are set. Therefore, it is possible to perform suitable abnormality detection in accordance with the operating state of the engine.

Moreover, the embodiments described above are exemplified for describing the invention and the scope of the invention is not intended to be limited only to the embodiments. Those skilled in the art can practice the invention in various other aspects without departing from the gist of the invention.

For example, a configuration in which the abnormality of the engine 201 is detected by using horsepower instead of the torque may be employed. In this case, in addition to each means described above, the onboard control device 217 is configured to have a tolerance generation horsepower calculation unit that converts power from the tolerance generation torque to a tolerance generation horsepower, a tolerance generation horsepower rate of change calculation unit that calculates a rate of change in the tolerance generation horsepower, an estimation generation horsepower calculation unit that converts power from the estimation generation torque to an estimation generation horsepower, and an estimation generation horsepower rate of change calculation unit that calculates a rate of change in the estimation generation horsepower. Then, the abnormality detection means (abnormality detection unit) 112 may detect that the engine 201 is abnormal in a case in which a state where a difference in horsepower that is a difference between the rate of change in the tolerance generation horsepower and the rate of change in the estimation generation horsepower exceeds a predetermined threshold is constituted equal to or greater than a predetermined time. Even in this configuration, the same effects as those of the embodiments described above can be achieved. That is, even if the difference in horsepower is used, it is possible to quickly and accurately detect the abnormality of the engine 201.

REFERENCE SIGNS LIST

101 drive manipulated variable detection means (drive manipulated variable detection unit)
102 engine rotation speed calculation means (operating state detection unit)
103 cylinder flow-in air volume calculation means (operating state detection unit)
109 target throttle opening degree calculation means (command value calculation unit)
110 tolerance generation torque calculation means (drive manipulation rate of change detection unit)
111 estimation generation torque calculation means (operating state rate of change calculation unit)
112 abnormality detection means (abnormality detection unit)
115 electrically controlled throttle control means (propulsive force control unit)
201 engine (drive source)
217 onboard control device

The invention claimed is:

1. An onboard control device comprising:
a drive manipulated variable detection unit that detects or estimates a drive manipulated variable manipulated by a driver in order to impart a propulsive force to a vehicle;
a command value calculation unit that calculates a command value for a drive source of the vehicle on the basis of the drive manipulated variable;
a propulsive force control unit that controls the propulsive force of the drive source on the basis of the command value;
operating state detection units that detect or estimate operating states of the drive source;
an abnormality detection unit that detects abnormalities in at least the drive source on the basis of the drive manipulated variable, the operating states, and a predetermined threshold;
a threshold variable unit that causes the predetermined threshold to be variable in accordance with a driving state of the vehicle or the drive source;
a drive manipulation rate of change calculation unit that calculates the rate of change in drive manipulation that is a rate of change in the drive manipulated variable or in a calculation value calculated on the basis of the drive manipulated variable; and an operating state rate of change calculation unit that calculates the rate of change in the operating state that is a rate of change in the operating state or in a calculation value calculated on the basis of the operating state, wherein the abnormality detection unit detects abnormalities in at least the drive source on the basis of the rate of change in drive manipulation and the rate of change in the operating state.

2. The onboard control device according to claim 1, wherein the abnormality detection unit detects abnormality in a case in which a state where a difference or a ratio between the rate of change in drive manipulation and the rate of change in the operating state exceeds a predetermined threshold is continued for a predetermined time or longer.

3. The onboard control device according to claim 2, wherein the threshold and the predetermined time are respectively set for each of the differences or the ratios.

4. The onboard control device according to claim 2, wherein the drive manipulation rate of change calculation unit calculates rates of change in drive manipulation for a plurality of different unit times and the operating state rate of change calculation unit calculates rates of change in the operating states for the plurality of different unit times.

5. The onboard control device according to claim 4, wherein the threshold and the predetermined time are respectively set for each of the differences or the ratios for the plurality of different unit times.

6. The onboard control device according to claim 2, wherein the threshold and the predetermined time are calculated on the basis of the operating states of the drive source.

7. The onboard control device according to claim 1, wherein in a case in which the abnormality is detected in the abnormality detection unit, a fail-safe process is performed to reduce the propulsive force of the drive source.

8. The onboard control device according to claim 2, wherein the drive manipulated variable detection unit detects or estimates the accelerator opening degree that is the drive manipulated variable, wherein the operating state detection unit detects or estimates a rotation speed and a load of an engine that is the drive source as the operating states, wherein the drive manipulation rate of change calculation unit calculates a tolerance generation torque and a rate of change in the tolerance generation torque on the basis of the accelerator opening degree and the rotation speed of the engine, wherein the operating state rate of change calculation unit calculates an estimation generation torque and a rate of change in the estimation generation torque on the basis of the rotation speed of the engine and the engine load, and wherein the abnormality detection unit detects the abnormality of the engine in a case in which a state where a difference in torque that is a difference between the rate of change in the tolerance generation torque and the rate of change in the estimation generation torque exceeds the predetermined threshold is continued for the predetermined time or longer.

9. The onboard control device according to claim 8, further comprising:

a tolerance generation horsepower calculation unit that converts power from the tolerance generation torque to a tolerance generation horsepower;

a tolerance generation horsepower rate of change calculation unit that calculates a rate of change in the tolerance generation horsepower;

an estimation generation horsepower calculation unit that converts power from the estimation generation torque to an estimation generation horsepower; and an estimation generation horsepower rate of change calculation unit that calculates a rate of change in the estimation generation horsepower, wherein the abnormality detection unit detects the abnormality of the engine in a case in which a state where a difference in horsepower that is a difference between the rate of change in the tolerance generation horsepower and the rate of change in the estimation generation horsepower exceeds the predetermined threshold is continued for the predetermined time or longer.

\* \* \* \* \*